US012481035B2

(12) United States Patent
Rabadam et al.

(10) Patent No.: US 12,481,035 B2
(45) Date of Patent: Nov. 25, 2025

(54) SILICON PHOTONIC SYSTEMS FOR LIDAR APPLICATIONS

(71) Applicant: Intel Corporation, Santa Clara, CA (US)

(72) Inventors: Eleanor Patricia Paras Rabadam, Folsom, CA (US); Guiyun Bai, Chandler, AZ (US); Israel Petronius, Haifa (IL); Sushrutha Gujjula, Chandler, AZ (US); Ronald L. Spreitzer, Phoenix, AZ (US); Kenneth Brown, Tempe, AZ (US); Konstantin Matyuch, Netanya (IL); Boping Xie, San Ramon, CA (US); Stephen Keele, New Holland, PA (US); Qifeng Wu, Hillsboro, OR (US); Ankur Agrawal, Chandler, AZ (US); Jonathan Doylend, Morgan Hill, CA (US); Sanjeev Gupta, Santa Rosa, CA (US); Sam Khalili, San Jose, CA (US); Daniel Grodensky, Haifa (IL); Nan Kong Ng, Kulim (MY); Ron Friedman, Givat Oz (IL); Gal Dvoretzki, Hod Hasharon (IL)

(73) Assignee: Intel Corporation, Santa Clara, CA (US)

( * ) Notice: Subject to any disclaimer, the term of this patent is extended or adjusted under 35 U.S.C. 154(b) by 827 days.

(21) Appl. No.: 17/558,201

(22) Filed: Dec. 21, 2021

(65) Prior Publication Data
US 2022/0404474 A1    Dec. 22, 2022

Related U.S. Application Data

(60) Provisional application No. 63/212,230, filed on Jun. 18, 2021.

(51) Int. Cl.
*G02B 6/42* (2006.01)
*F21V 8/00* (2006.01)
(Continued)

(52) U.S. Cl.
CPC .......... *G01S 7/4818* (2013.01); *G01S 17/931* (2020.01); *G02B 6/0085* (2013.01);
(Continued)

(58) Field of Classification Search
CPC ... G02B 6/0085; G02B 6/3814; G02B 6/4269
See application file for complete search history.

(56) References Cited

U.S. PATENT DOCUMENTS

| 2014/0192832 A1* | 7/2014 | Shih | H01L 25/04 372/44.01 |
| 2016/0124164 A1* | 5/2016 | Doerr | G02B 6/428 385/14 |

(Continued)

FOREIGN PATENT DOCUMENTS

| CN | 204989541 U | * 1/2016 | |
| CN | 109088963 A | * 12/2018 | H04M 1/026 |

(Continued)

OTHER PUBLICATIONS

JP-2018093007-A English translation (Year: 2018).*
CN-109088963-A English translation (Year: 2018).*

*Primary Examiner* — Charlie Y Peng
(74) *Attorney, Agent, or Firm* — Akona IP PC

(57) ABSTRACT

Disclosed herein are light detection and ranging (LIDAR) systems and methods for manufacturing the same. The LIDAR systems may include microelectronics packages that may include a chassis, an insert, a photonic integrated circuit (PIC), and a lid. The chassis may define an opening. The insert is sized to be received in the opening. The insert is made of a thermally conductive material. The PIC is
(Continued)

attached to the insert. The lid is connected to the chassis and defines a cavity that encases the PIC. Both the insert and the lid form thermally conductive pathways away from the PIC.

25 Claims, 14 Drawing Sheets

(51) Int. Cl.
    *G01S 7/481*     (2006.01)
    *G01S 17/931*     (2020.01)
    *G02B 6/38*     (2006.01)

(52) U.S. Cl.
    CPC ......... *G02B 6/3814* (2013.01); *G02B 6/4269* (2013.01); *G02B 6/428* (2013.01)

(56) References Cited

U.S. PATENT DOCUMENTS

| | | | |
|---|---|---|---|
| 2017/0160501 A1* | 6/2017 | Schultz | G02B 6/4245 |
| 2018/0156972 A1* | 6/2018 | Kainuma | H05K 1/183 |
| 2020/0295528 A1* | 9/2020 | Du | H01S 5/02325 |
| 2021/0329810 A1* | 10/2021 | Goergen | H05K 7/2039 |

FOREIGN PATENT DOCUMENTS

| | | | | | |
|---|---|---|---|---|---|
| CN | 208489525 U | * | 2/2019 | | |
| EP | 1251566 A1 | * | 10/2002 | ............. | H10F 77/50 |
| JP | 2018093007 A | * | 6/2018 | ......... | G02B 6/12004 |

\* cited by examiner

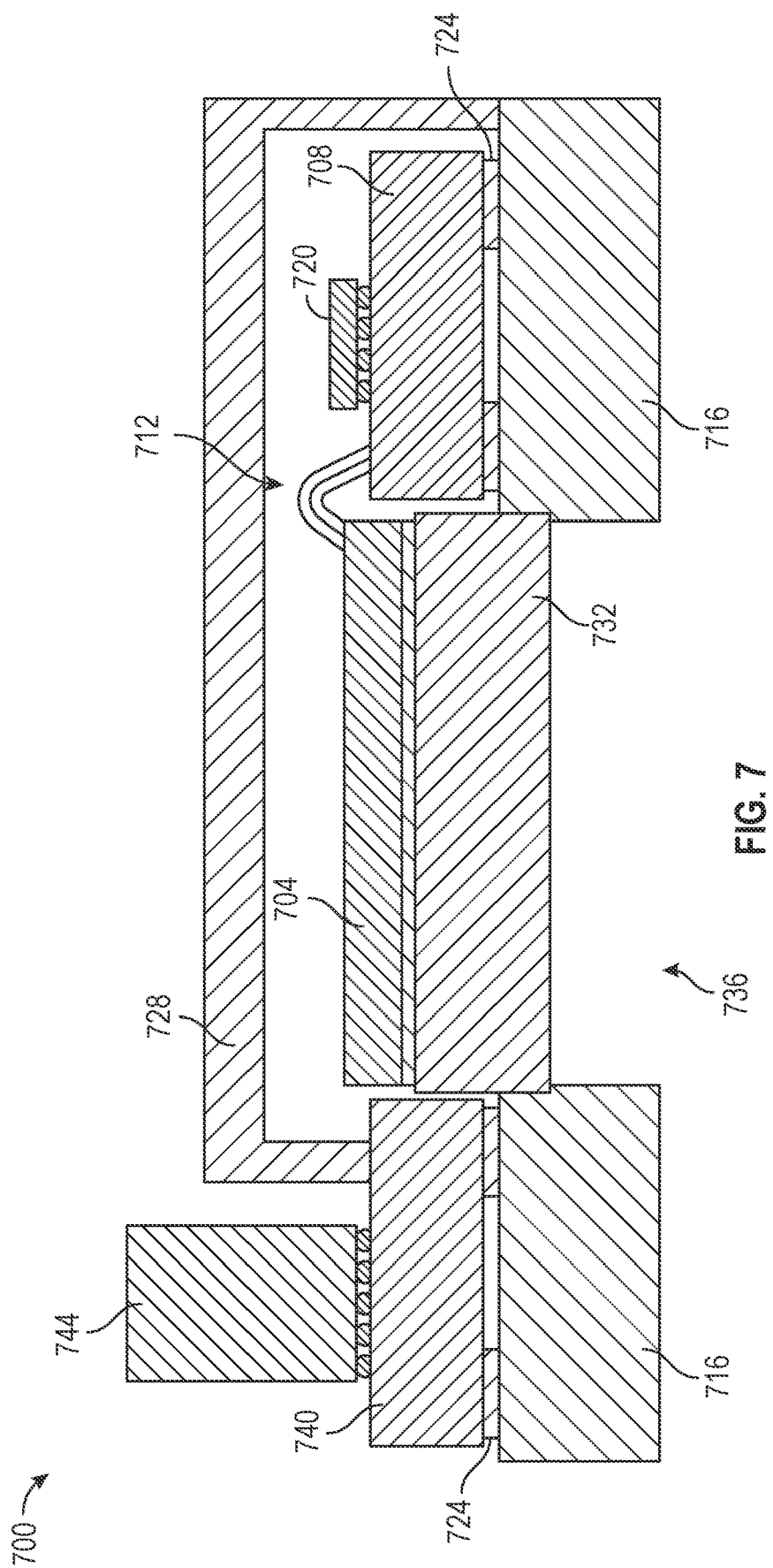

SILICON PHOTONIC SYSTEMS FOR LIDAR APPLICATIONS

PRIORITY CLAIM

The present application claims priority to U.S. Provisional Application No. 63/212,230, entitled "Silicon Photonics Gold Box System in Module," filed on Jun. 18, 2021; the contents of which are hereby incorporated in their entirety.

FIELD OF THE DISCLOSURE

The present subject matter relates to microelectronics packages. More specifically, the present disclosure relates to silicon photonic systems for light detection and ranging (LIDAR) systems in microelectronics package applications.

BACKGROUND

Silicon photonics is commonly used in various optical technology, including Light Detection and Ranging (LIDAR). A LIDAR system includes many optical components such as a trans-impedance amplifier, laser drivers, optical switches, semiconductor optical amplifiers, radio frequency modulators, etc. A LIDAR system may include both electrical integrated circuits (EICs) as well as photonic integrated circuits (PICs). Sharing communication and other signals between EICs and PICs is an important part of a LIDAR system.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 7 shows a cross-sectional a gold box in accordance with at least one embodiment of this disclosure.

DETAILED DESCRIPTION

Figure 1:
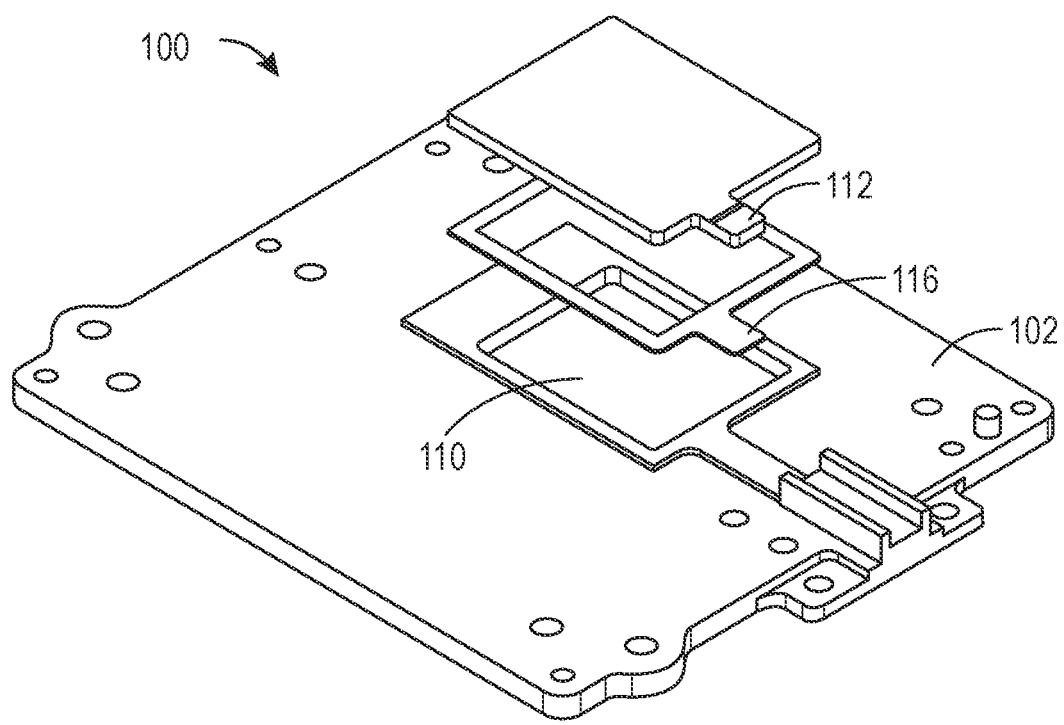
FIG. 1 shows an exploded perspective view of a gold box module consistent with at least one embodiment of this disclosure.

Silicon photonics-based LIDAR (Light Detection and Ranging) systems are being developed to meet the needs for increased sensor capability and functionality in autonomous vehicles. As an increasing number of sensors need to fit within a constrained vehicle space, manufacturers are increasingly faced with the challenge to shrink the form factor of LIDAR systems.

The technologies disclosed herein enable the integration of the silicon photonics dies with discrete active, passive, and optical components within a "gold box" system in module", resulting in smaller LIDAR systems. As used herein, "gold box" or "gold box system in module" refers to a packaging of multiple components together in one box.

The technologies disclosed herein provide an approach for solving the technical challenges of silicon photonics integrated circuit die (photonics integrated circuit die (PIC)) heat dissipation, as single packaged die or co-packaged solution comprised of several die; optical, electrical, and flexible mechanical connection of a PIC to other LIDAR system components; and integration of an organic package substrate or PCB (Printed Circuit Board) and discrete optical components in the "gold box" module, resulting in a smaller form factor and reduced assembly cost.

The systems and methods disclosed herein may enable integration of silicon photonics dies with discrete active, passive, and optical components within the gold box system in module, resulting in smaller LIDAR system form factor. The systems and methods disclosed herein may implement thermal solutions to dissipate heat from the PIC silicon die and increase chassis/board/system level thermal management efficiency. Thermally conductive ceramic inserts, such as an aluminum nitride insert, may be attached to the metal chassis, to enable heat dissipation channel from the silicon die to the bottom of the gold box module. A thermal interface material (TIM) may be used to dissipate heat to the heat transfer interface at the bottom of the gold box module. Still consistent with embodiments disclosed herein, thermal solution approaches may add copper filled thermal vias in the metal chassis. A heat spreader die (HSD) may be used to dissipate heat from the top side of the PIC die to the gold box assembly lid, using a TIM. This heat spreader die approach may enable dual heat flows from the top and bottom sides of the gold box module.

Rigid-flex-rigid PCB and connector sub-assembly systems may be implemented to provide electrical and mechanical connection flexibility between the gold box module and other LIDAR system components. The rigid flex PCB may be integrated into the gold box module sub-assembly as disclosed herein.

An organic substrate or PCB may be attached to the metal chassis to enable wire bond electrical connection between the PIC and other LIDAR system components. Low Modulus adhesives may be used to absorb mechanical stress and mitigate reliability risk as disclosed herein. An Organic Substrate with specialty surface finish may be used to enable both surface mount and wire bond capability on the same surface in various embodiments disclosed herein.

To minimize space and maximize electrical performance for optical device packaging, optical discrete components may be attached directly to the PIC die and the gold box module chassis. The gold box module may connect the optical interface to the LIDAR system thru active alignment of the fiber array unit (FAU) and the lens to the optical input array side of the PIC. Passive alignment adhesive process may enable light outcoupling platform between the PIC and the optical discrete components.

As disclosed herein, the silicon photonics LIDAR system may have a reduced form factor, and enable integration of more sensors within a constrained space in an autonomous vehicle. Additional benefits of the systems and methods disclosed herein, include, but are not limited to, simplification in module assembly and reduced assembly cost.

The above discussion is intended to provide an overview of subject matter of the present patent application. It is not intended to provide an exclusive or exhaustive explanation. The description below is included to provide further information.

Figure 2A:
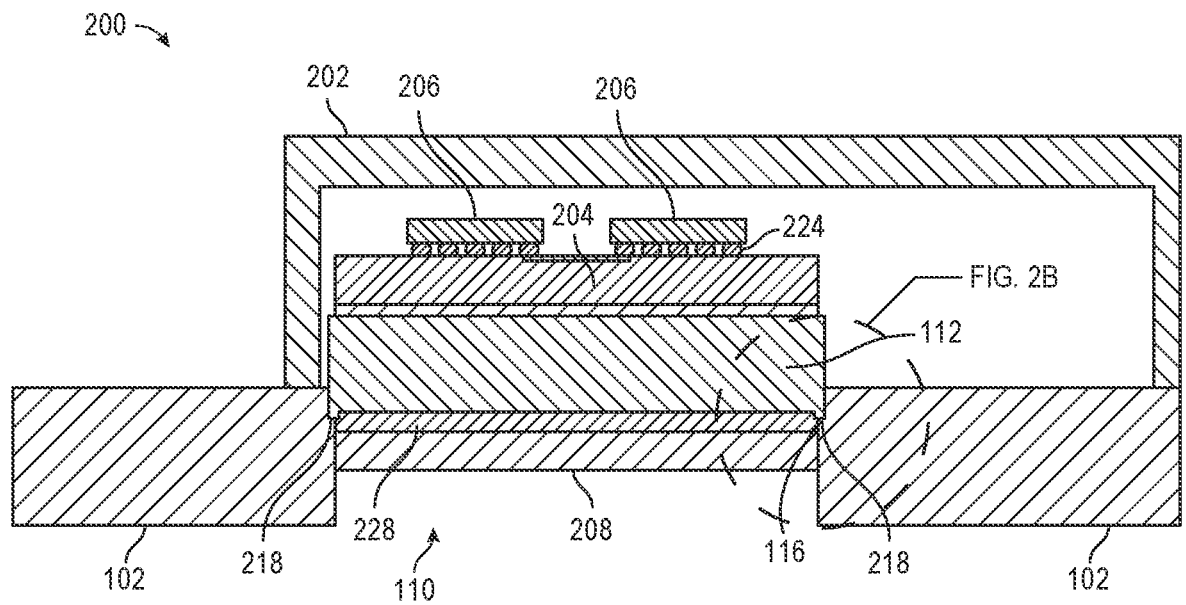
FIG. 2A shows a cross-sectional view of a component of a LIDAR system in accordance with at least one embodiment of this disclosure.

Turning now to the figures, FIG. 1 shows an exploded perspective view of a gold box module 100 in accordance with at least one embodiment of this disclosure. Gold box module 100 may include a chassis 102 that defines a hole 110, solder or sinter paste 116, and an insert 112, FIG. 2A shows a cross-sectional view of a LIDAR gold box 200, such as gold box module 100. Gold box 200 may include chassis 102 having a low thermal conductivity and a lid 202 that defines a cavity, Chassis 102 and/or lid 202 may comprise Invar, aluminum, copper, iron, steel, gold, or any other suitable material. Chassis 102 may comprise a low coefficient of thermal expansion (CTE) metal alloy with low thermal conductivity. Gold box 200 may further comprise a silicon photonic integrated circuit die (PIC) 204 encased by lid 202 within the cavity defined by lid 202, transimpedance amplifier (TIAs) or other integrated circuits 206, and a heat transfer interface 208 that may be located in a cut out or hole 110 in chassis 102.

Figure 2B:
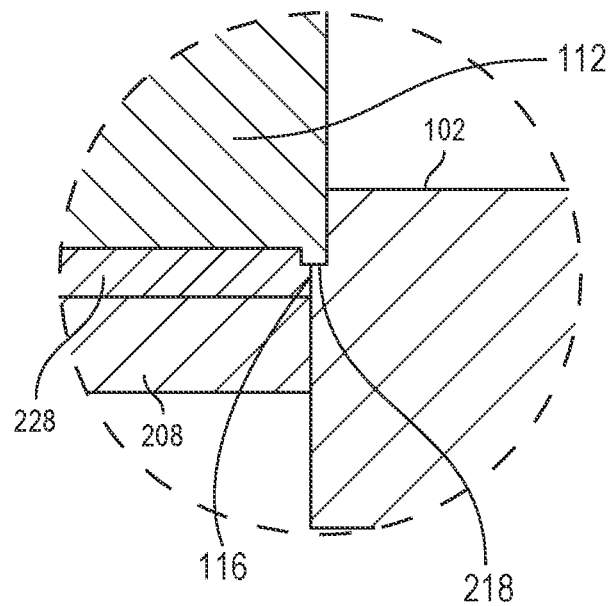
FIG. 2B shows a detail view of a component of a LIDAR system in accordance with the at least one embodiment of this disclosure.

Consistent with embodiments disclosed herein, insert 112, which may have a high thermal conductivity, may transport heat generated by PIC 204 to heat transfer interface 208. Chassis cut out 110 may include a step wedge 218 (shown in detail in FIG. 2B) and solder or sinter paste 116 is used to attach insert 112 to step wedge 218. Heat transfer interface 208 is located in hole 110. Still consistent with embodiments disclosed herein, other suitable materials may be used to attach insert 112 to heat transfer interface 208. Insert 112 may be a high thermal conductivity ceramic material, such as aluminum nitride, or other suitable high thermal conductivity material. Flip chip technology, in which TIA 206 die directly attaches to PIC 204 via coupling components 224 (e.g., solder balls or bumps), can be used to attach TIAs 206 to the PIC 204. In various embodiments disclosed herein, PIC 204 may have dimensions of 24 mm×16 mm×0.4 mm. A thermal interface material 228 may thermally couple insert 112 to heat transfer interface 208. Heat transfer interface 208 may connect gold box 100 to other components of a system within which gold box 100 is placed, that can aid in dissipating the heat generated by PIC 204, such as a heat sink or heat pipe.

Figure 3:
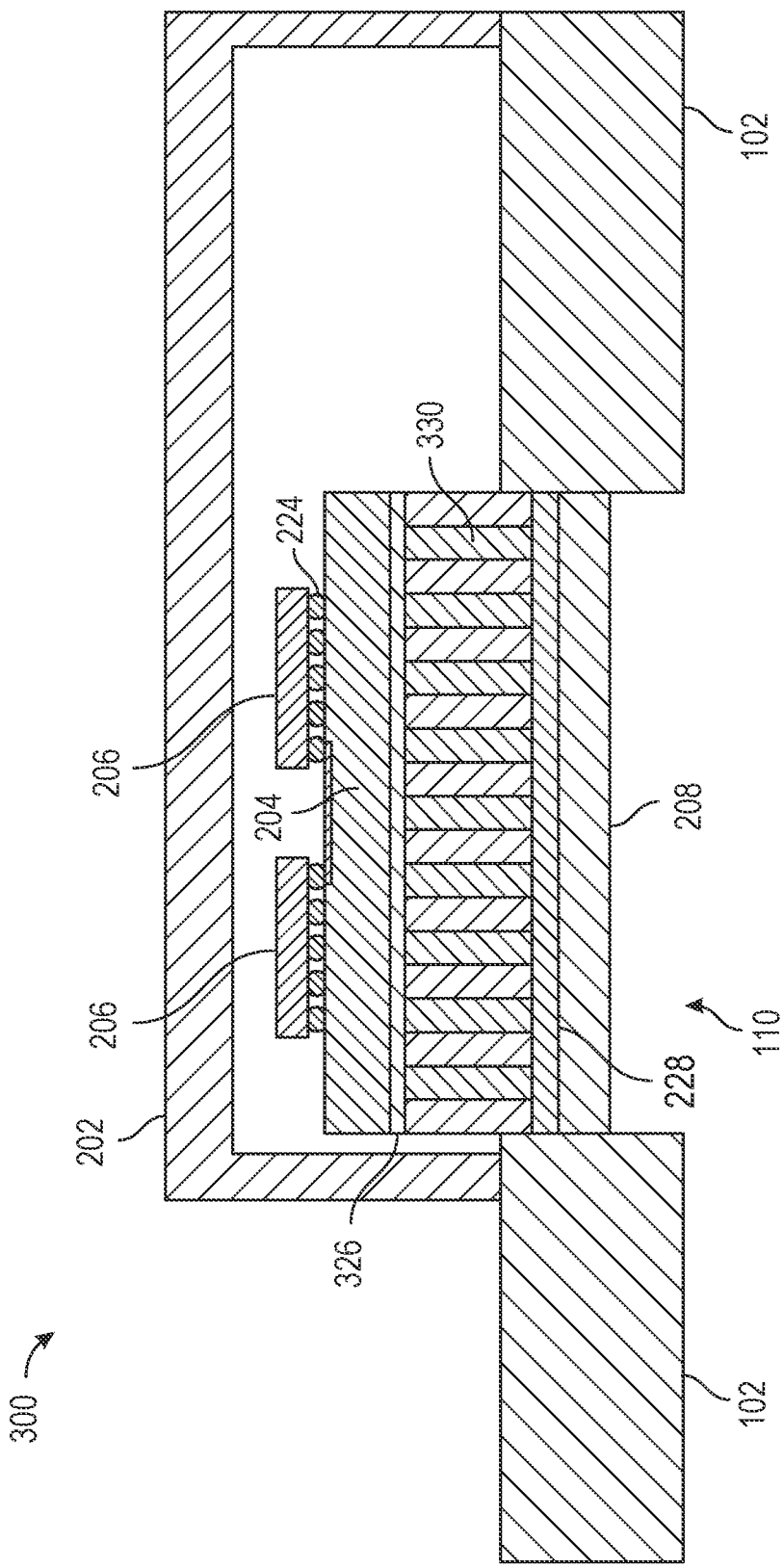
FIG. 3 shows a cross-sectional view of a component of a LIDAR system in accordance with at least one embodiment of this disclosure.

FIG. 3 shows a cross-sectional view of a gold box 300, such as for a LIDAR system, in accordance with at least one embodiment of this disclosure. Gold box 300 may be similar to gold box 100 and 200 but with thermal vias 330 used in place of a high thermal conductivity insert to transport heat from PIC 204 to the heat transfer interface 208. In some embodiments, thermal vias 330 may be copper-filled thermal vias. In other embodiments, thermal vias 330 may comprise other suitable thermally conductive materials.

Figure 4:
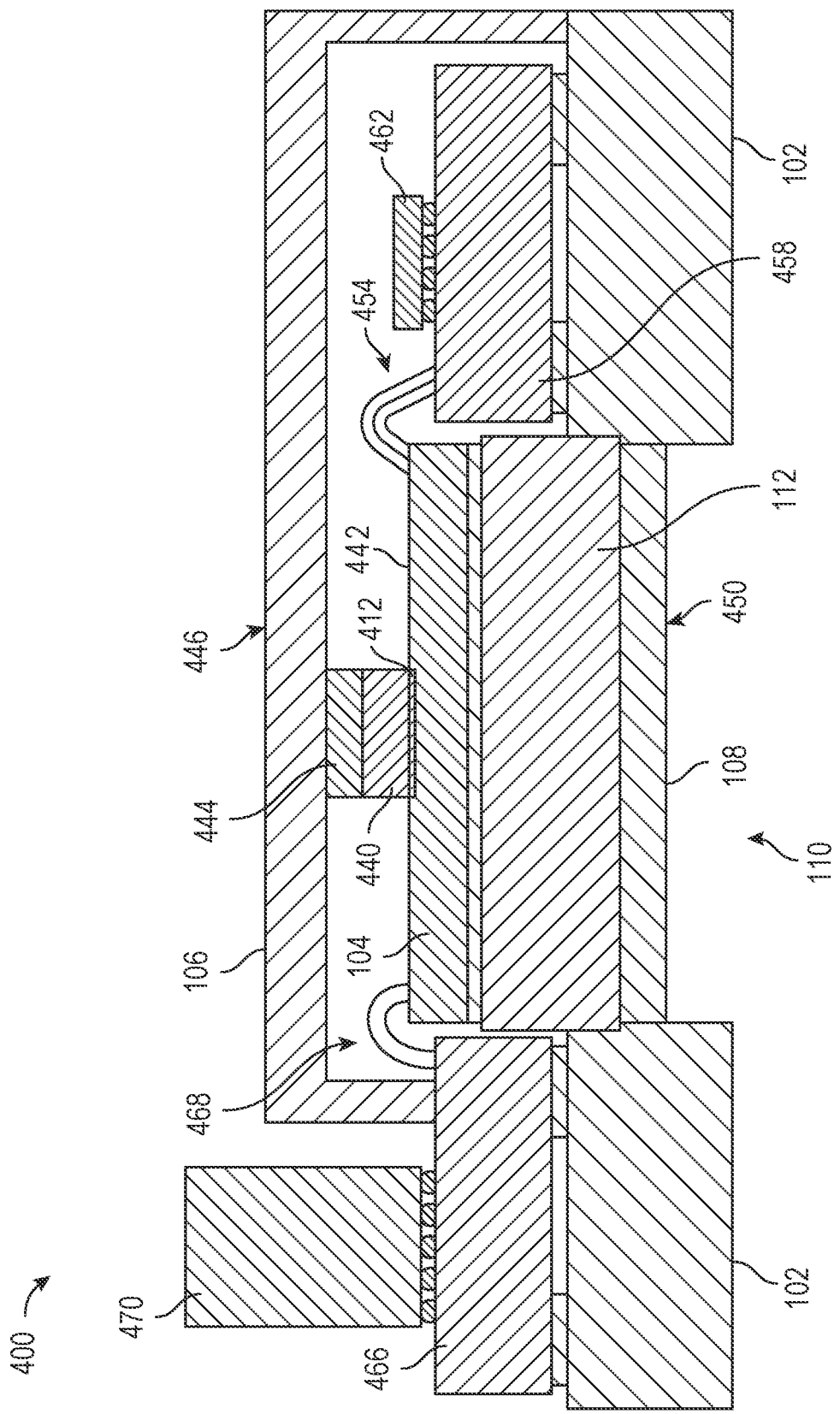
FIG. 4 shows a cross-sectional view of a component of a LIDAR system in accordance with at least one embodiment of this disclosure.

FIG. 4 shows a cross-sectional view of gold box 400, such as for a LIDAR system, in accordance with at least one embodiment of this disclosure. Gold box 400 may include chassis 102 with hole 110, lid 106, and PIC 104 that is attached to a high thermal conductivity ceramic insert 112 to transport heat from PIC 104 to a heat transfer interface 108. The dissipation of heat generated by PIC 104 may be further aided by a heat spreader die 440 attached to a top face 442 of PIC 104 and lid 106 by thermal interface material (TIM) layer 444 that may be located in between PIC 104 and an inner surface of lid 106, Heat spreader die 440 may be embodied as a passive silicon die 412 that can be flip chipped on certain power dissipating locations on PIC 404, thereby providing a low-cost heat dissipation path through HSD die 440. The heat spreader die embodiment illustrated in FIG. 4 may enable dual heat flows from a surface 446 and a bottom surface 450 of gold box module 400.

PIC 104 may be attached via wire bonds 454 to a first printed circuit board (PCB) or organic substrate 458. Substrate 458 may be connected to a second integrated circuit die 462 located within gold box module 400. Substrate 458 may be attached to chassis 102. Gold box module 400 may further include a second printed circuit board or organic substrate 466 that may be attached to PIC 104 via wire bonds 468, chassis 102 and a connector 470 that may provide an electrical connection from the printed circuit board or organic substrate 466 to other system components. PCBs or organic substrates 458 and 466 may be combined into one piece of PCB or organic substrate with a cut out or hole to allow direct attachment of PIC 104 to insert 112.

Silicon photonic ICs (PICs) may need to be electrically connected to other components within a LIDAR system. Due to form factor, space, and orientation constraints placed on a LIDAR gold box module, such as gold box modules 100, 200, 300, and 400, located within a LIDAR system, connections from the gold box module to other system components may need to have some degree of flexibility to meet mechanical tolerance requirements. The rigid-flex-rigid PCB and connector sub-assembly disclosed herein provides such mechanical flexibility.

Figure 5:
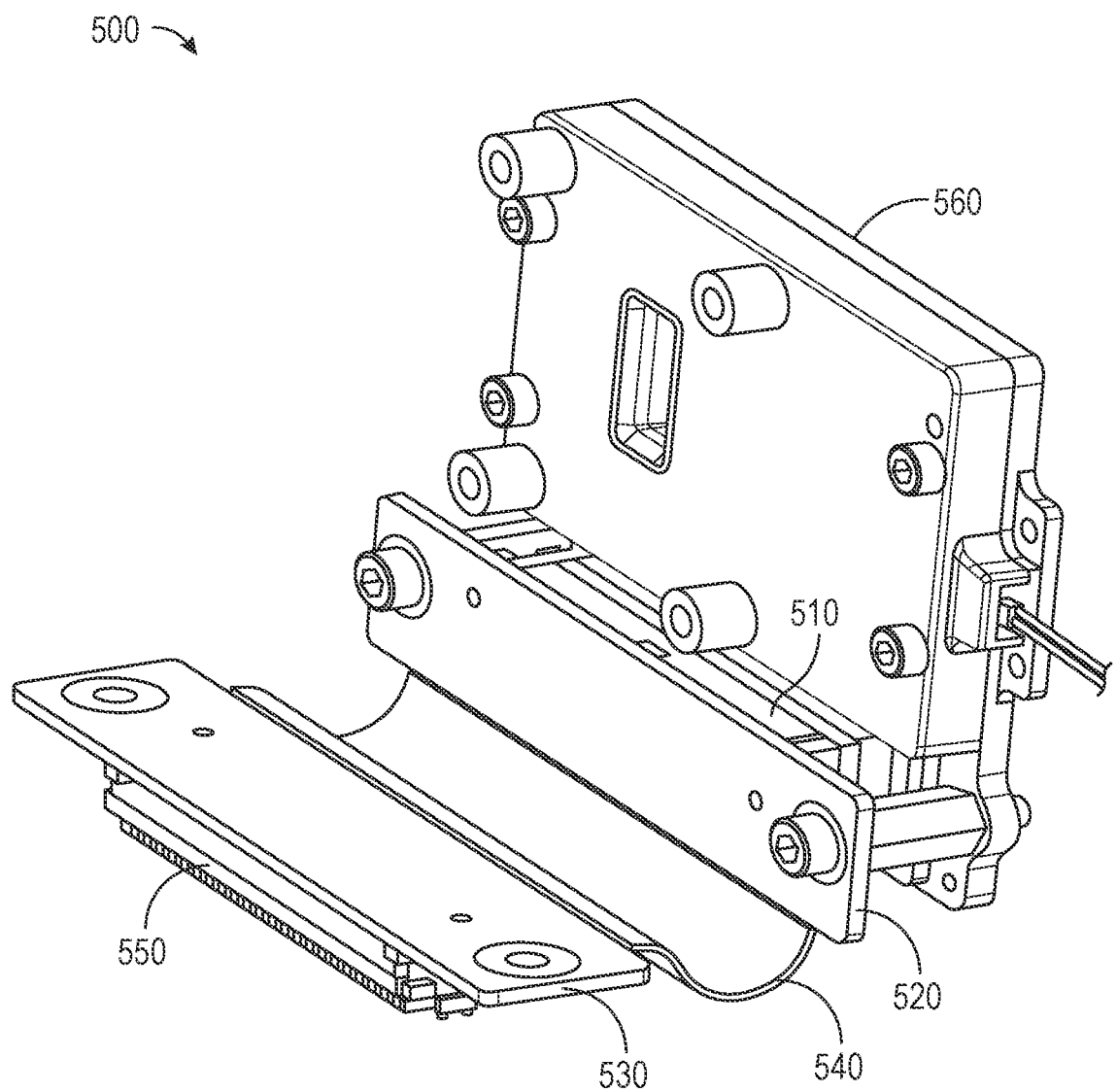
FIG. 5 shows a perspective view of a connector subassembly connected to a gold box in accordance with at least one embodiment of this disclosure.

FIG. 5 shows a perspective view of an example sub-assembly 500 in accordance with at least one embodiment of this disclosure. Sub-assembly 500 may include a first rigid printed circuit board 520 at a first end of a flexible printed circuit board 540 and a second rigid printed circuit board 530 at a second end of flexible printed circuit board 540. Rigid printed circuit boards 520 and 530 may provide mechanical support for connectors 510 and 550 and flexible printed circuit board 540 may provide mechanical orientation flexibility. Connector 510 may be connected to a LIDAR gold box module 560 (e.g., modules 100, 200, 300, and 400).

Figure 6:
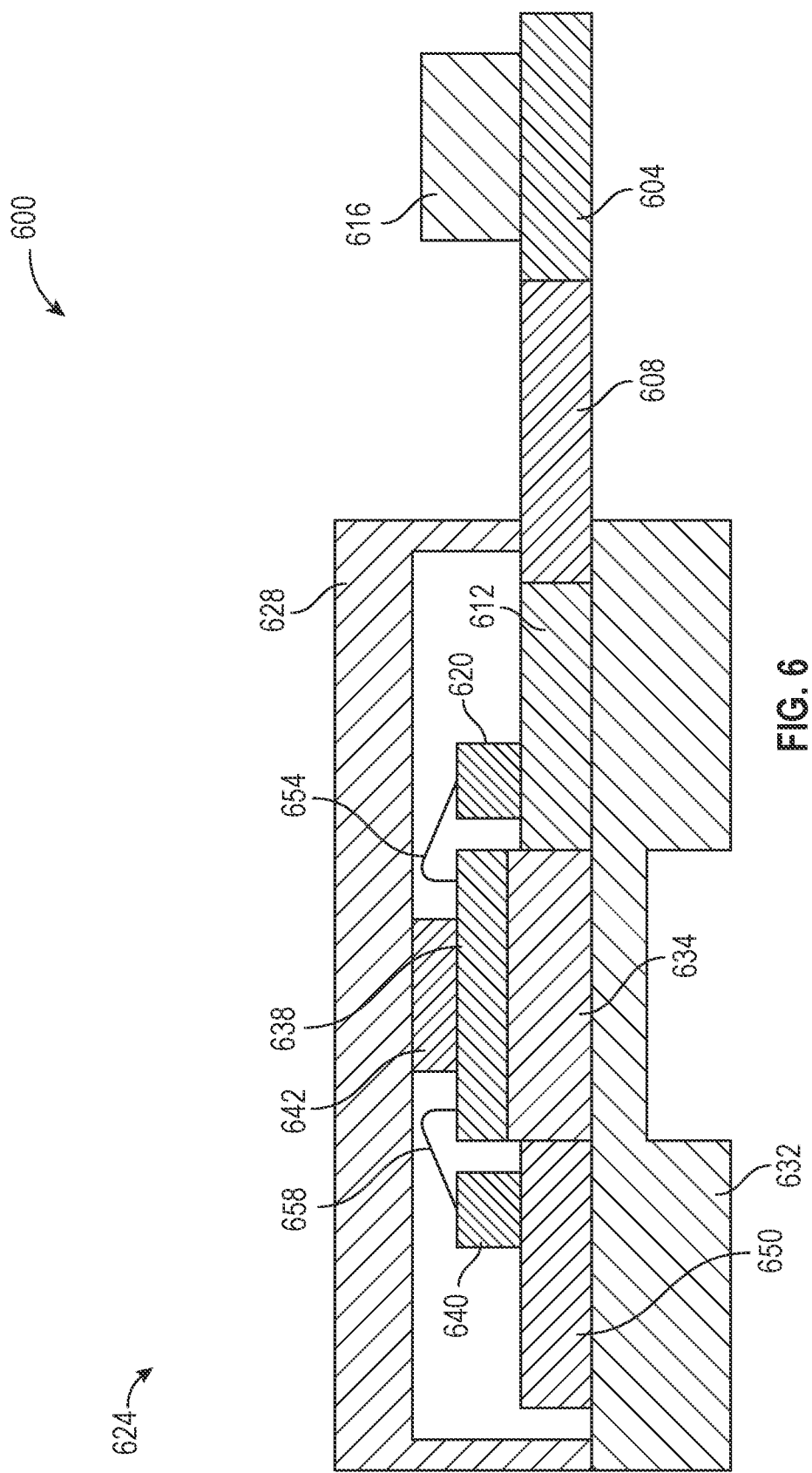
FIG. 6 shows a cross-sectional view of printed circuit board integrated into a gold box in accordance with at least one embodiment of this disclosure.

FIG. 6 illustrates a cross-sectional view of an example rigid flex printed circuit board 600 integrated into a LIDAR gold box module 624 in accordance with at least one embodiment of this disclosure. Rigid flex printed circuit board 600 may include a first rigid printed circuit board 604, a flexible printed circuit board 608, and a second rigid printed circuit board 612. First and second rigid printed circuit boards 604 and 612 may provide mechanical support for a connector (to other LIDAR system components) 616 and a first organic substrate 620 of LIDAR gold box module 624. Flexible printed circuit board 608 may provide mechanical orientation flexibility. Second rigid printed circuit board 612 may be laminated or adhered to a metal chassis component of gold box module 624. Connector 616 may be attached to rigid printed circuit board 604 by, for example, a surface mount connection and substrate 620 may be attached to first rigid printed circuit board 612.

Gold box module 624 may further include a lid 628, a chassis 632 with raised chassis portion 634, a PIC 638, a TIA 642, a third rigid printed circuit board 650, and a second organic substrate 640. PIC 638 and TIA 642 may be positioned on raised chassis portion 634. PIC 638 may be attached to first organic substrate 620 via first wire bonds 654 and to second organic substrate 640 via second wire bonds 658. The second rigid printed circuit board 612 and third rigid printed circuit board 650 may be combined into one rigid printed circuit board with a cut out or hole that aligns with the raised chassis portion 634.

FIG. 7 shows an example LIDAR gold box module 700 in accordance with at least one embodiment of this disclosure. Gold box module 700 may include a PIC 704 that is attached to a first organic substrate or printed circuit board 708 via wire bonds 712. Wire bonds 712 may allow for electrical communications between PIC 704 and an integrated circuit die 720.

Gold box module 700 may further comprise a lid 728, a high thermal conductivity insert 732 located within a hole 736 of module chassis 716, a second organic substrate or printed circuit board 740, and a connector 744 for connecting gold box module 700 to other components. First and second organic substrate or printed circuit boards 708 and 740 may be attached to metal chassis 716. In some embodiments, first and second organic substrate or printed circuit boards 708 and 740 may be attached to metal chassis 716 with an adhesive 724. Adhesive 724 may be strong enough to withstand the mechanical shock and vibration that can occur under automotive use conditions. First and second organic substrate or printed circuit boards 708 and 740 may be combined into one organic substrate or printed circuit board with a cut out or hole that aligns with the high thermal conductivity insert 732.

To absorb the mechanical stress due to CTE mismatch between first and second organic substrate or printed circuit boards 708 and 740 and metal chassis 716, a low modulus adhesive can be used as adhesive 724 to attach organic substrates 708 and 740 to metal chassis 716 or to laminate or adhere the printed circuit boards 708 and 740 to metal chassis 716. By using a low modulus adhesive, mechanical stresses can be absorbed and reliability risk mitigated.

Figure 8A:
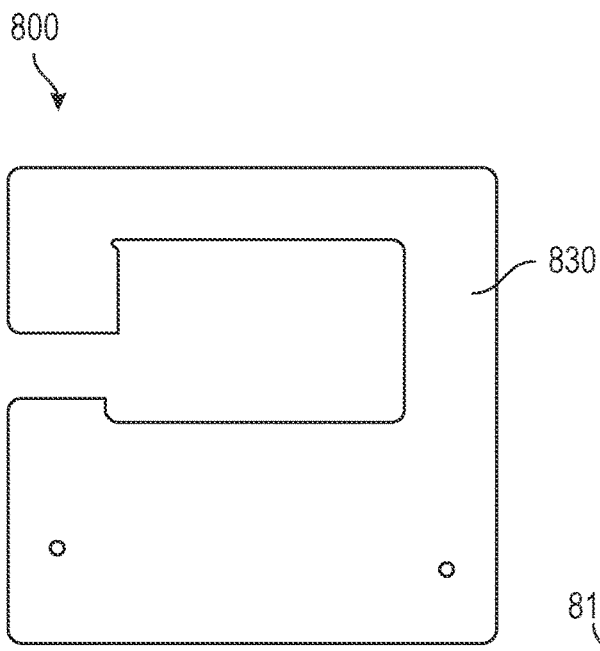
FIGS. 8A, 8B, and 8C show adhesive patterns in accordance with at least one embodiment of this disclosure.
Figure 8B:
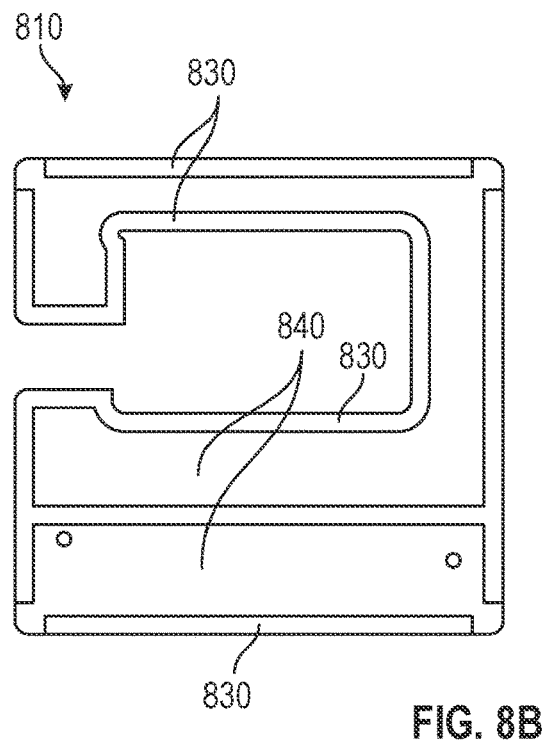
Figure 8C:
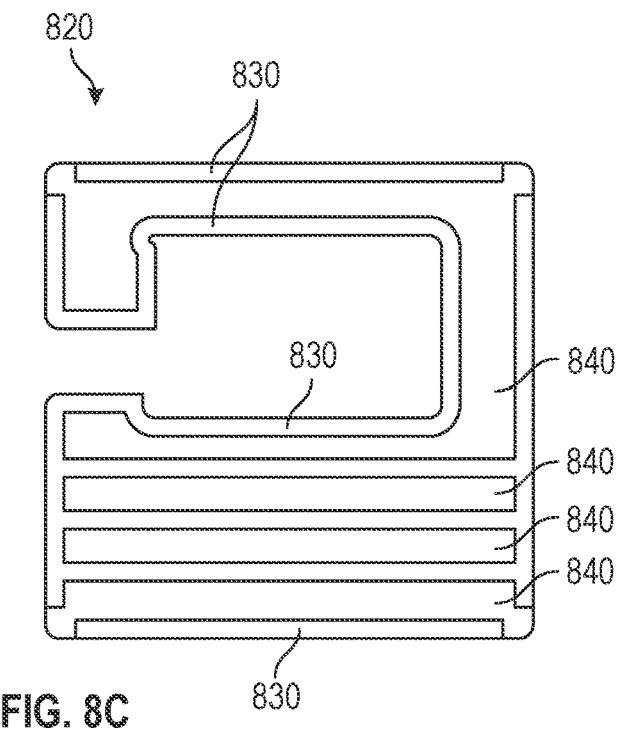

FIGS. 8A, 8B, and 8C show example adhesive patterns 800, 810, and 820 on an organic substrate or printed circuit board for attaching an organic substrate or printed circuit board to a LIDAR gold box module chassis. The adhesive dispense patterns 800, 810, and 820 may provide for localized stress reduction within organic substrates or printed circuit boards. Regions 830 may be low modulus adhesive and regions 840 may represent the organic substrate or printed circuit board.

Figure 9:
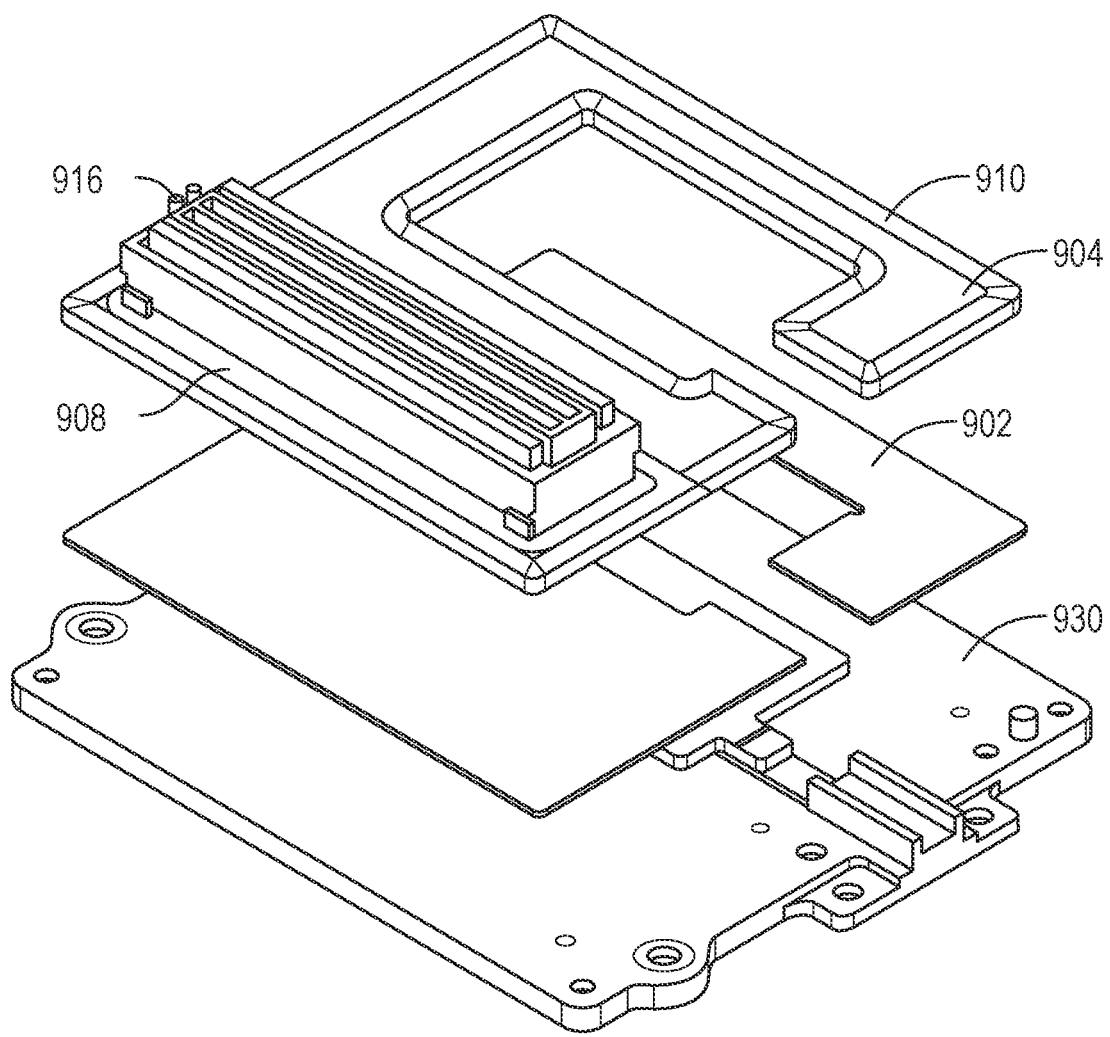
FIG. 9 shows an exploded perspective view of a gold box module in accordance with at least one embodiment of this disclosure.

FIG. 9 shows an exploded perspective view of a LIDAR gold box module 900 in accordance with at least one embodiment of this disclosure. Gold box module 900 includes an example adhesive pattern 902 for attaching a first organic substrate or printed circuit board 904 and a second organic substrate or printed circuit board 908 to a metal chassis 930 of gold box module 900. An additional LIDAR gold box module component (not shown) may be attached to a connector 916 that may be attached to second organic substrate or printed circuit board 908. First and second organic substrate or printed circuit boards 904 and 908 may be combined into one organic substrate or printed circuit board with a cut out or hole that aligns with the raised pedestal portion of chassis 930.

Figure 10:
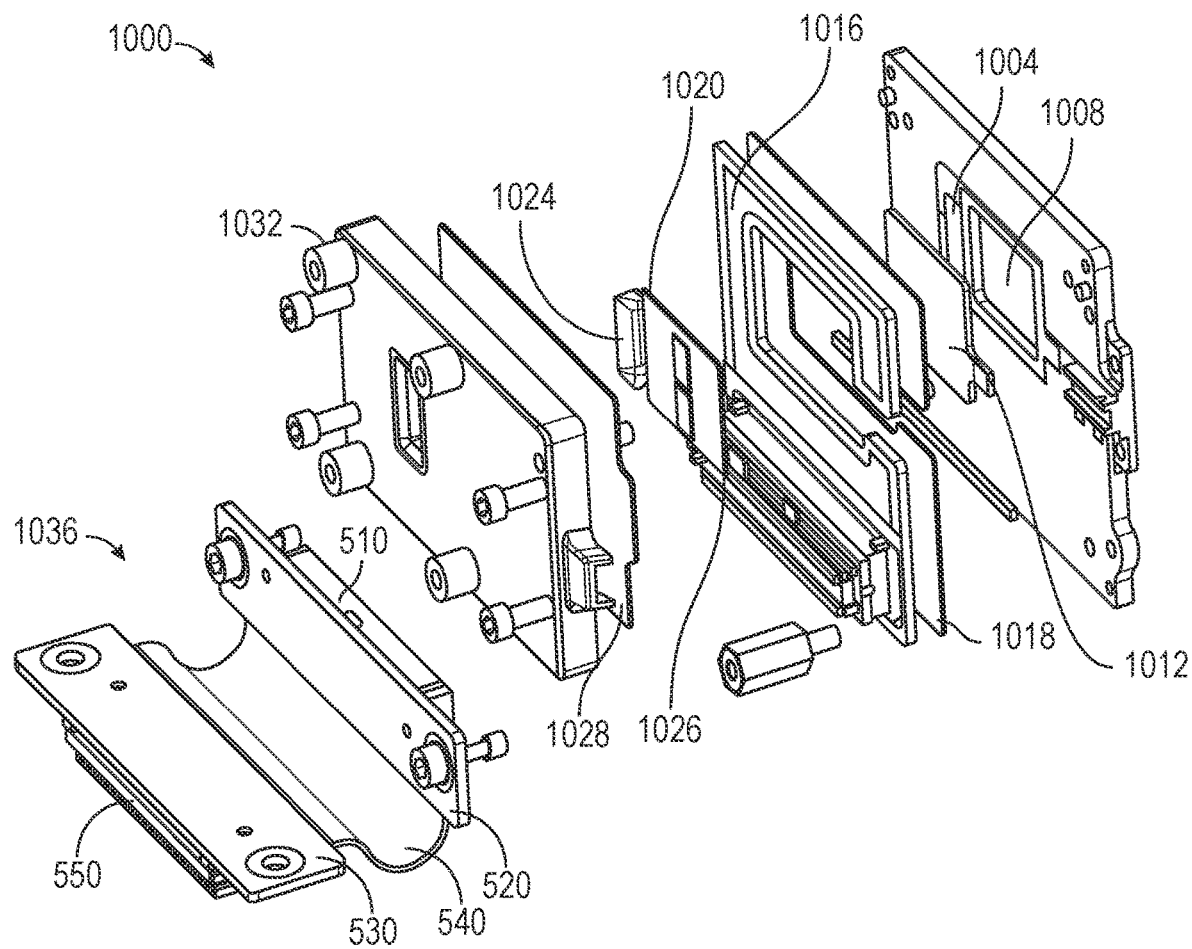
FIG. 10 shows an exploded perspective view of a gold box module in accordance with at least one embodiment of this disclosure.

To enable optical coupling between a PIC and the LIDAR system within which the PIC is located, discrete optical components may be mechanically attached inside a LIDAR gold box module. FIG. 10 shows an exploded perspective view of a LIDAR gold box module 1000 in accordance with at least one embodiment of this disclosure. Gold box module 1000 comprises a chassis 1004 that defines a chassis hole 1008, a high thermal conductivity insert 1012, an organic substrate or printed circuit board 1016, an adhesive 1018 for attaching organic substrate or printed circuit board 1016 to chassis 1004, a PIC 1020, a prism-Faraday rotator-half wave plate sub-assembly 1024, a fiber array unit 1026, a light absorber 1028, a cover 1032, and a rigid-flex-rigid printed circuit board and connector sub-assembly 1036, such as described herein with respect to at least FIG. 5. Prism-Faraday rotator-half wave plate sub-assembly 1024 may be passively aligned and directly attached to PIC 1020 via a dispensed adhesive material.

The fiber array unit 1026 may be attached to insert 1012 or chassis 1004 via a dispensed adhesive material. A lens, such as described below with respect to FIG. 11, may be directly attached to PIC 1020 via a dispensed adhesive material. These optical assemblies may be placed using active alignment processes. Light absorber 1028 may be directly attached to cover 1032.

Figure 11:
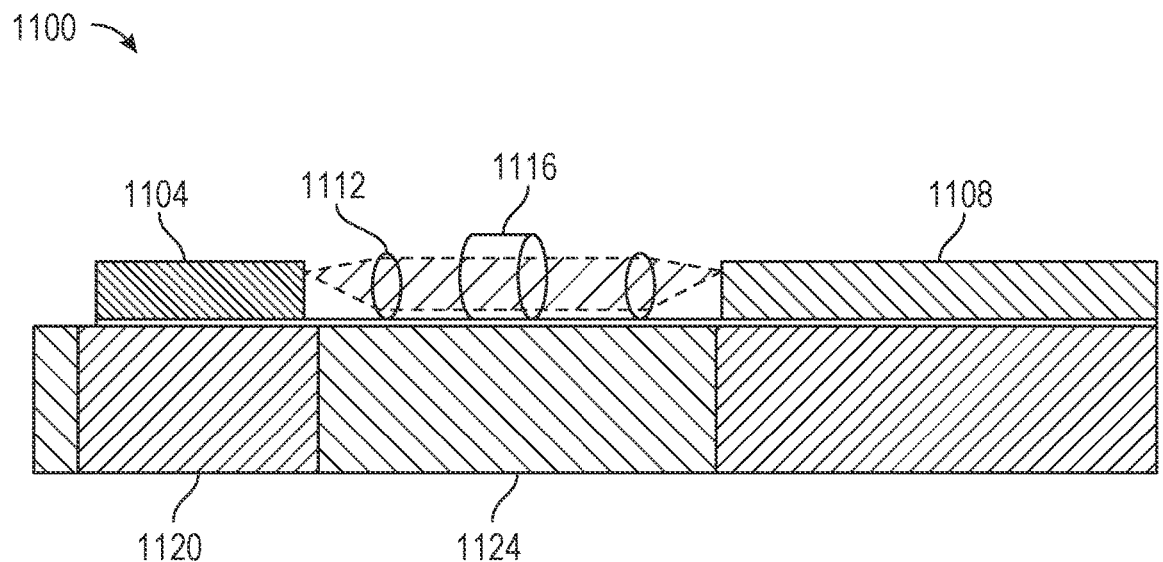
FIG. 11 shows a LIDAR transceiver PIC die and laser PIC die in accordance with at least one embodiment of this disclosure.

FIG. 11 illustrates module that includes a LIDAR transceiver PIC die 1104 and a laser PIC die 1108 packaged together in module 1100 in accordance with at least one embodiment of this disclosure. Module 1100 may include laser PIC die 1104, LIDAR transceiver PIC die 1108, a lens array 1112, and an isolator 1116. Module 1100 may further include a high thermal conductivity insert 1120 (e.g., an insert comprising aluminum nitride as disclosed herein) and a chassis 1124. Packaging transceiver PIC die 1108 and laser PIC die 1104 in the same module may eliminate the need to integrate a fiber array unit and lens components and the required active alignment attachment processes in the module, which can simplify the assembly process and reduce cost.

Any of the LIDAR gold box modules described herein can be used in any device, system, or apparatus to which LIDAR technology can be applied, such as aerial vehicles (e.g., drones, planes) or automotive vehicles (e.g., cars, trucks).

In any of the embodiments in which the LIDAR gold box module comprises an organic substrate, the organic substrate can comprise a surface finish that enables both surface mount and wire bond capability on the same surface.

Various ones of the embodiments described herein reduce space and improve electrical performance for optical device packaging by attaching optical discrete components directly to the PIC and the module chassis. An optical interface for any of the modules described herein can interface to a LIDAR system via active alignment of the fiber array unit and the lens to the optical input array side of the PIC. Light outcoupling between the PIC and the optical discrete components is enabled through a passive alignment adhesive process.

Figure 12:
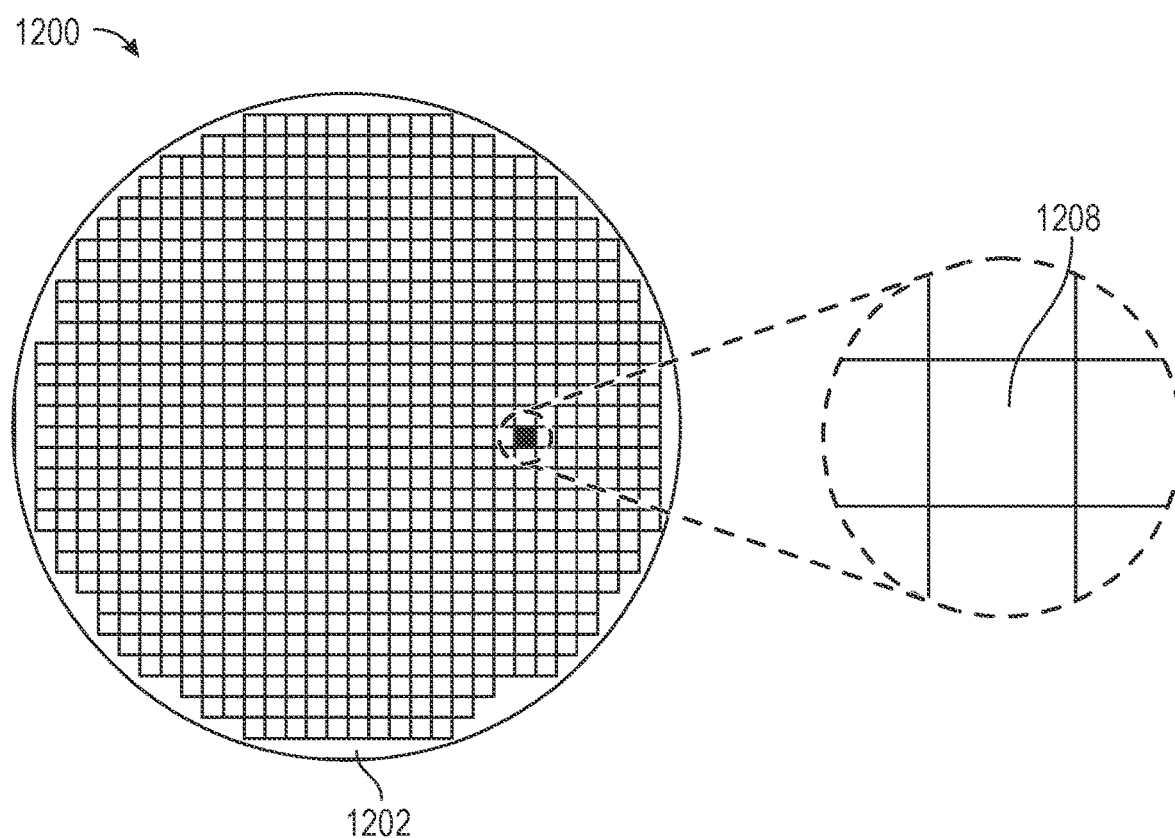
FIG. 12 shows a top view of a wafer and dies that may be included in a microelectronic assembly in accordance with at least one embodiment of this disclosure.

FIG. 12 is a top view of a wafer 1200 and dies 1202 that may be included in any of the gold boxes or other systems disclosed herein (e.g., as any suitable ones of dies 206, 204, 462 etc.). Wafer 1200 may be composed of semiconductor material and may include one or more dies 1202 having integrated circuit structures formed on a surface of wafer 1200. The individual dies 1202 may be a repeating unit of an integrated circuit product that includes any suitable integrated circuit. After the fabrication of the semiconductor product is complete, wafer 1200 may undergo a singulation process in which dies 1202 are separated from one another to provide discrete "chips" of the integrated circuit product. Die 1208 may be any of dies 206, 204, 462 disclosed herein. Die 1208 may include one or more transistors (e.g., some of the transistors 1340 of FIG. 13, discussed below), supporting circuitry to route electrical signals to the transistors, passive components (e.g., signal traces, resistors, capacitors, or inductors), and/or any other integrated circuit components. In some embodiments, wafer 1200 or die 1208 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1208. For example, a memory array formed by multiple memory devices may be formed on a same die 1208 as a processor unit (e.g., the processor unit 1510 of FIG. 15) or other logic that is configured to store information in the memory devices or execute instructions stored in the memory array. Various ones of the gold boxes disclosed herein may be manufactured using a die-to-wafer assembly technique in which some dies are attached to wafer 1200 that include others of dies and wafer 1200 is subsequently singulated.

Figure 13:
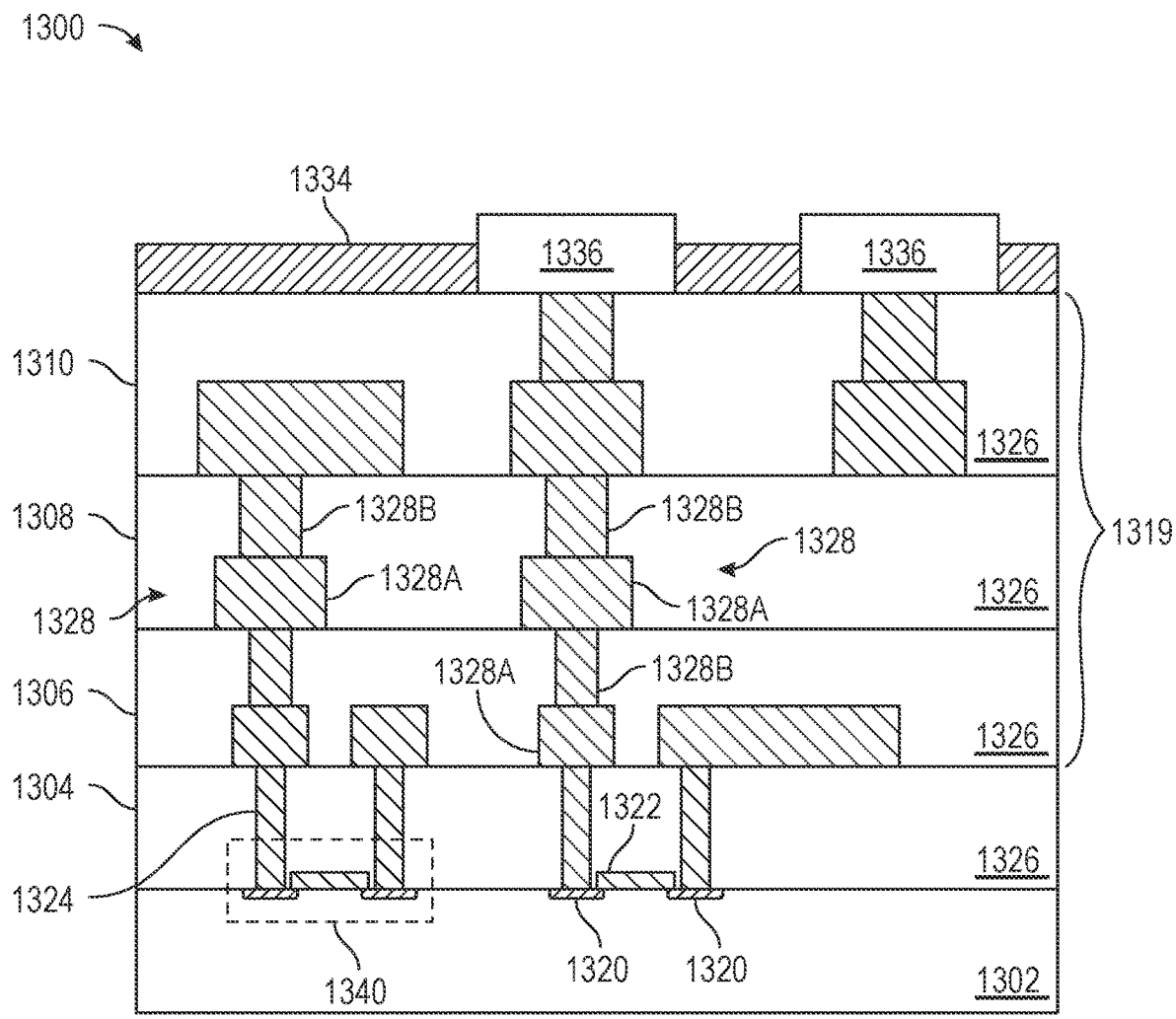
FIG. 13 is a cross-sectional side view of an integrated circuit device that may be included in a microelectronic assembly in accordance with at least one embodiment of this disclosure.

FIG. 13 is a cross-sectional side view of an integrated circuit device 1300 that may be included in any of gold boxes disclosed herein. One or more of integrated circuit devices 1300 may be included in one or more dies 1202 (see FIG. 12, for example). Integrated circuit device 1300 may be formed on a die substrate 1302 (e.g., wafer 1200 of FIG. 12, for example) and may be included in a die (e.g., die 1202 of FIG. 12, for example). Die substrate 1302 may be a semiconductor substrate composed of semiconductor material systems including, for example, n-type or p-type materials systems (or a combination of both). Die substrate 1302 may include, for example, a crystalline substrate formed using a bulk silicon or a silicon-on-insulator (SOI) substructure. In some embodiments, die substrate 1302 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group or IV may also be used to form die substrate 1302. Although a few examples of materials from which die substrate 1302 may be formed are described here, any material that may serve as a foundation for integrated circuit device 1300 may be used. Die substrate 1302 may be part of a singulated die (e.g., dies 1202 of FIG. 12, for example) or a wafer (e.g., water 1200 of FIG. 12, for example).

Integrated circuit device 1300 may include one or more device lavers 1304 disposed on die substrate 1302. Device layer 1304 may include features of one or more transistors 1340 (e.g., metal oxide semiconductor field-effect transistors (MOSFETs)) formed on die substrate 1302. Transistors 1340 may include, for example, one or more source and/or drain (S/D) regions 1320, a gate 1322 to control current flow between S/D regions 1320, and one or more S/D contacts 1324 to route electrical signals to/from S/D regions 1320. Transistors 1340 may include additional features not depicted for the sake of clarity, such as device isolation regions, gate contacts, and the like. Transistors 1340 are not limited to the type and configuration depicted in FIG. 13 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon, nanosheet, or nanowire transistors.

Transistor 1340 may include a gate 1322 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether transistor 1340 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of transistor 1340 along the source-channel-drain direction, the gate electrode may consist of a U-shaped structure that includes a bottom portion substantially parallel to the surface of die substrate 1302 and two sidewall portions that are substantially perpendicular to the top surface of die substrate 1302. In other embodiments, at least one of the metal layers that form the gate electrode may simply be a planar layer that is substantially parallel to the top surface of die substrate 1302 and does not include sidewall portions substantially perpendicular to the top surface of die substrate 1302. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

S/D regions 1320 may be formed within die substrate 1302 adjacent to gate 1322 of individual transistors 1340. S/D regions 1320 may be formed using an implantation/diffusion process or an etching/deposition process, for example. In the former process, dopants such as boron, aluminum, antimony, phosphorous, or arsenic may be ion-implanted into die substrate 1302 to form S/D regions 1320. An annealing process that activates the dopants and causes them to diffuse farther into die substrate 1302 may follow the ion-implantation process. In the latter process, die substrate 1302 may first be etched to form recesses at the locations of S/D regions 1320. An epitaxial deposition process may then be carried out to fill the recesses with material that is used to fabricate S/D regions 1320. In some implementations, S/D regions 1320 may be fabricated using a silicon alloy such as silicon germanium or silicon carbide. In some embodiments, the epitaxially deposited silicon alloy may be doped in situ with dopants such as boron, arsenic, or phosphorous. In some embodiments, S/D regions 1320 may be formed using one or more alternate semiconductor materials such as germanium or a group III-V material or alloy. In further embodiments, one or more layers of metal and/or metal alloys may be used to form S/D regions 1320.

Electrical signals, such as power and/or input/output (I/O) signals, may be routed to and/or from the devices (e.g., transistors 1340) of device layer 1304 through one or more interconnect layers disposed on device layer 1304 (illustrated in FIG. 13 as interconnect layers 1306-1310). For example, electrically conductive features of device layer 1304 (e.g., gate 1322 and S/D contacts 1324) may be electrically coupled with interconnect structures 1328 of interconnect layers 1306-1310. One or more interconnect layers 1306-1310 may form a metallization stack (also referred to as an "ILD stack") 1319 of integrated circuit device 1300.

Interconnect structures 1328 may be arranged within interconnect layers 1306-1310 to route electrical signals according to a wide variety of designs; in particular, the arrangement is not limited to the particular configuration of interconnect structures 1328 depicted in FIG. 13. Although a particular number of interconnect layers 1306-1310 is depicted in FIG. 13, embodiments of the present disclosure include integrated circuit devices having more or fewer interconnect layers than depicted.

In some embodiments, interconnect structures 1328 may include lines 1328A and/or vias 1328B filled with an electrically conductive material such as a metal. Lines 1328A may be arranged to route electrical signals in a direction of a plane that is substantially parallel with a surface of die substrate 1302 upon which device layer 1304 is formed, example, lines 1328A may route electrical signals in a direction in and out of the page and/or in a direction across page. Vias 1328B may be arranged to route electrical signals in a direction of a plane that is substantially perpendicular to the surface of die substrate 1302 upon which device layer 1304 is formed. In some embodiments, vias 1328B may electrically couple lines 1328A of different interconnect layers 1306-1310 together.

Interconnect layers 1306-1310 may include a dielectric material 1326 disposed between interconnect structures 1328, as shown in FIG. 13. In some embodiments, dielectric material 1326 disposed between interconnect structures 1328 in different ones of interconnect layers 1306-1310 may have different compositions; in other embodiments, the composition of dielectric material 1326 between different interconnect layers 1306-1310 may be the same. Device layer 1304 may include a dielectric material 1326 disposed between transistors 1340 and a bottom layer of the metallization stack as well. Dielectric material 1326 included in device layer 1304 may have a different composition than dielectric material 1326 included in interconnect layers 1306-1310; in other embodiments, the composition of dielectric material 1326 in device layer 1304 may be the same as a dielectric material 1326 included in any one of interconnect layers 1306-1310.

A first interconnect layer 1306 (sometimes referred to as Metal 1 or "M1") may be formed directly on the device layer 1304. In some embodiments, first interconnect layer 1306 may include lines 1328A and/or vias 1328B, as shown. Lines 1328A of the first interconnect layer 1306 may be coupled with contacts (e.g., S/D contacts 1324) of device layer 1304. Vias 1328B of first interconnect layer 1306 may be coupled with lines 1328A of a second interconnect layer 1308.

Second interconnect layer 1308 (sometimes referred to as Metal 2 or "M2") may be formed directly on first interconnect layer 1306. In some embodiments, second interconnect layer 1308 may include via 1328B to couple lines 1328 of second interconnect layer 1308 with lines 1328A of a third interconnect layer 1310. Although lines 1328A and vias 1328B are structurally delineated with a line within individual interconnect layers for the sake of clarity, lines 1328A and vias 1328B may be structurally and/or materially contiguous (e.g., simultaneously filled during a dual-damascene process) in some embodiments.

Third interconnect layer 1310 (sometimes referred to as Metal 3 or "M3") (and additional interconnect layers, as desired) may be formed in succession on second interconnect layer 1308 according to similar techniques and configurations described in connection with second interconnect layer 1308 or first interconnect layer 1306. In some embodiments, the interconnect layers that are "higher up" in metallization stack 1319 in integrated circuit device 1300 (i.e., farther away from device layer 1304) may be thicker that the interconnect layers that are lower in metallization stack 1319, with lines 1328A and vias 1328B in the higher interconnect layers being thicker than those in the lower interconnect layers.

Integrated circuit device 1300 may include a solder resist or passivation material 1334 (e.g., polyimide or similar material) and one or more conductive contacts 1336 formed on interconnect layers 1306-1310. In FIG. 13, conductive contacts 1336 are illustrated as taking the form of bond pads. Conductive contacts 1336 may be electrically coupled with interconnect structures 1328 and configured to route the electrical signals of transistor(s) 1340 to external devices. For example, solder bonds may be formed on the one or more conductive contacts 1336 to mechanically and/or electrically couple an integrated circuit die including integrated circuit device 1300 with another component (e.g., a printed circuit board). Integrated circuit device 1300 may include additional or alternate structures to route the electrical signals from interconnect layers 1306-1310. For example, conductive contacts 1336 may include other analogous features (e.g., posts) that route the electrical signals to external components. Conductive contacts 1336 may serve as part of or connect to interconnect layers 1306, 1310, as appropriate.

In some embodiments in which integrated circuit device 1300 is a double-sided die, integrated circuit device 1300 may include another metallization stack (not shown) on the opposite side of device layers 1304. This metallization stack may include multiple interconnect layers as discussed above with reference to interconnect layers 1306-1310, to provide conductive pathways (e.g., including conductive lines and vias) between device layers 1304 and additional conductive contacts (not shown) on the opposite side of integrated circuit device 1300 from conductive contacts 1336. These additional conductive contacts may serve as part of or connect to interconnect layers as appropriate.

In other embodiments in which integrated circuit device 1300 is a double-sided die, integrated circuit device 1300 may include one or more through silicon vias (TSVs) through die substrate 1302; these TSVs may make contact with device layers 1304, and may provide conductive pathways between the device layers 1304 and additional conductive contacts (not shown) on the opposite side of integrated circuit device 1300 from conductive contacts 1336. These additional conductive contacts may serve as part of or connect to interconnects as appropriate. Multiple integrated circuit devices 1300 may be stacked with one or more TSVs in the individual stacked devices that can provide connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 14:
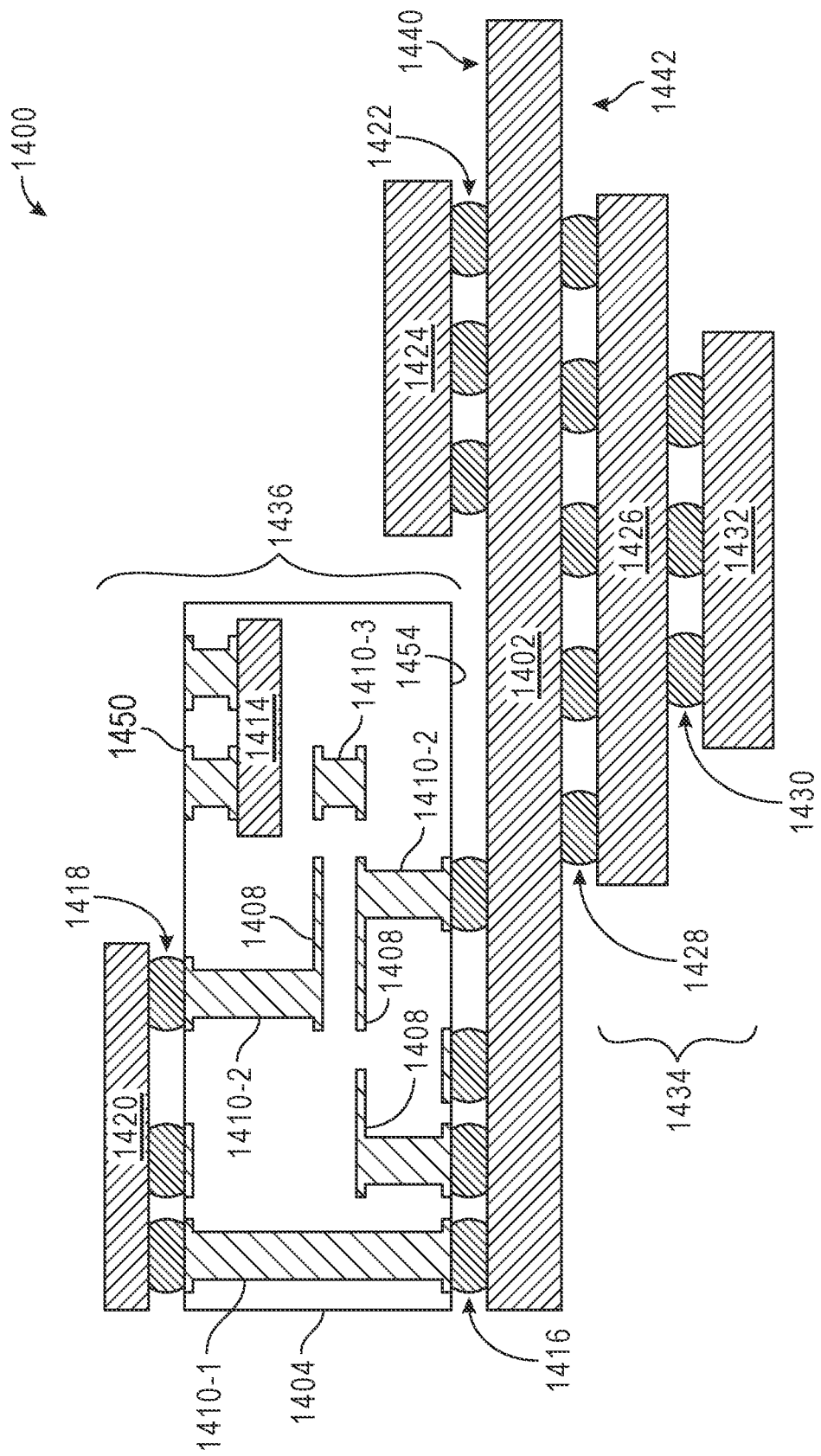
FIG. 14 is a cross-sectional side view of an integrated circuit device assembly that may include a microelectronic assembly in accordance with at least one embodiment of this disclosure.

FIG. 14 is a cross-sectional side view of an integrated circuit device assembly 1400 that may include any of the gold boxes disclosed herein. As disclosed herein, integrated circuit device assembly 1400 may be embodied in gold boxes. Integrated circuit device assembly 1400 may include a number of components disposed on a circuit board 1402 (which may be a motherboard, system board, mainboard, etc.). Integrated circuit device assembly 1400 may include components disposed on a first face 1440 of circuit board 1402 and an opposing second face 1442 of circuit board 1402; generally, components may be disposed on one or both faces 1440 and 1442. Any of the integrated circuit components discussed herein with reference to the integrated circuit device assembly 1400 may take the form of any suitable ones of the embodiments of the LILT AR gold boxes disclosed herein.

In some embodiments, circuit board 1402 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to circuit board 1402. In other embodiments, circuit board 1402 may be a non-PCB substrate. Integrated circuit device assembly 1400 illustrated in FIG. 14 includes a package-on-interposer structure 1436 coupled to first face 1440 of circuit board 1402 by coupling components 1416. Coupling components 1416 may electrically and mechanically couple the package-on-interposer structure 1436 to circuit board 1402, and may include solder balls (as shown in FIG. 14), pins (e.g., as part of a pin grid array (PGA), contacts (e.g., as part of a land grid array (LGA)), male and female portions of a socket, an adhesive, an underfill material, and/or any other suitable electrical and/or mechanical coupling structure. Coupling components 1416 may serve as the coupling components illustrated or described for any of the substrate assembly or substrate assembly components described herein, as appropriate.

Package-on-interposer structure 1436 may include an integrated circuit component 1420 coupled to an interposer 1404 by coupling components 1418. Coupling components 1418 may take any suitable form for the application, such as the forms discussed above with reference to coupling components 1416. Although a single integrated circuit component 1420 is shown in FIG. 14, multiple integrated circuit components may be coupled to interposer 1404; indeed, additional interposers may be coupled to interposer 1404. Interposer 1404 may provide an intervening substrate used to bridge circuit board 1402 and the integrated circuit component 1420.

Integrated circuit component 1420 may be a packaged or unpackaged integrated circuit product that includes one or more integrated circuit dies (e.g., die 1202 of FIG. 12, the integrated circuit device 1300 of FIG. 13) and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 1420, a single monolithic integrated circuit die comprises solder bumps attached to contacts on the die. The solder bumps allow the die to be directly attached to the interposer 1404. Integrated circuit component 1420 can comprise one or more computing system components, such as one or more processor units (e.g., system-on-a-chip (SoC), processor core, graphics processor unit (GPU), accelerator, chipset processor), I/O controller, memory, or network interface controller. In some embodiments, integrated circuit component 1420 can comprise one or more additional active or passive devices such as capacitors, decoupling capacitors, resistors, inductors, fuses, diodes, transformers, sensors, electrostatic discharge (ESD) devices, and memory devices.

In embodiments where integrated circuit component 1420 comprises multiple integrated circuit dies, the dies can be of the same type (a homogeneous multi-die integrated circuit components or of two or more different types (a heterogeneous multi-die integrated circuit component). A multi-die integrated circuit component can be referred to as a multi-chip package (MCP) or multi-chip module (MCM).

In addition to comprising one or more processor units, integrated circuit component 1420 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets." In embodiments where an integrated circuit component comprises multiple integrated circuit dies, interconnections between dies can be provided by the package substrate, one or more silicon interposers, one or more silicon bridges embedded in the package substrate (such as INTEL® embedded multi-die interconnect bridges (EMIBs)), or combinations thereof.

Generally, interposer 1404 may spread connections to a wider pitch or reroute a connection to a different connection. For example, interposer 1404 may couple the integrated circuit component 1420 to a set of ball grid array (BGA) conductive contacts of coupling components 1416 for coupling to circuit board 1402. In the embodiment illustrated in FIG. 14, integrated circuit component 1420 and circuit board 1402 are attached to opposing sides of interposer 1404. In other embodiments, integrated circuit component 1420 and circuit board 1402 may be attached to a same side of interposer 1404. In some embodiments, three or more components may be interconnected by way of interposer 1404.

In some embodiments, interposer 1404 may be formed as a PCB, including multiple metal layers separated from one another by layers of dielectric material and interconnected by electrically conductive vias. In embodiments where the interposer is a non-printed circuit board, interposer 1404 may be formed of an epoxy resin, a fiberglass-reinforced epoxy resin, an epoxy resin with inorganic fillers, a ceramic material, or a polymer material such as polyimide. In some embodiments, interposer 1404 may be formed of alternate rigid or flexible materials that may include the same materials described above for use in a semiconductor substrate, such as silicon, germanium, and other group III-V and group IV materials. Interposer 1404 may include metal interconnects 1408 and vias 1410, including but not limited to through hole vias 1410-1 (that extend from a first face 1450 of interposer 1404 to a second face 1454 of interposer 1404), blind vias 1410-2 (that extend from the first or second faces 1450 or 1454 of interposer 1404 to an internal metal layer), and buried vias 1410-3 (that connect internal metal layers).

In some embodiments, interposer 1404 can comprise a silicon interposer. Through silicon vias (TSV) extending through the silicon interposer can connect connections on a first face of a silicon interposer to an opposing second face of the silicon interposer. In some embodiments, interposer 1404 comprising a silicon interposer can further comprise one or more routing layers to route connections on a first face of interposer 1404 to an opposing second face of interposer 1404.

Interposer 1404 may further include embedded devices 1414, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on interposer 1404. Package-on-interposer structure 1436 may take the form of any of the package-on-interposer structures known in the art.

Integrated circuit device assembly 1400 may include an integrated circuit component 1424 coupled to first face 1440 of circuit board 1402 by coupling components 1422. Coupling components 1422 may take the form of any of the embodiments discussed above with reference to coupling components 1416, and integrated circuit component 1424 may take the form of any of the embodiments discussed above with reference to integrated circuit component 1420.

Integrated circuit device assembly 1400 illustrated in FIG. 14 includes a package-on-package structure 1434 coupled to second face 1442 of circuit board 1402 by coupling components 1428. Package-on-package structure 1434 may include an integrated circuit component 1426 and an integrated circuit component 1432 coupled together by coupling components 1430 such that the integrated circuit component 1426 is disposed between circuit board 1402 and integrated circuit component 1432. Coupling components 1428 and 1430 may take the form of any of the embodiments of coupling components 1416 discussed above, and integrated circuit components 1426 and 1432 may take the form of any of the embodiments of integrated circuit component 1420 discussed above, Package-on-package structure 1434 may be configured in accordance with any of the package-on-package structures known in the art.

Figure 15:
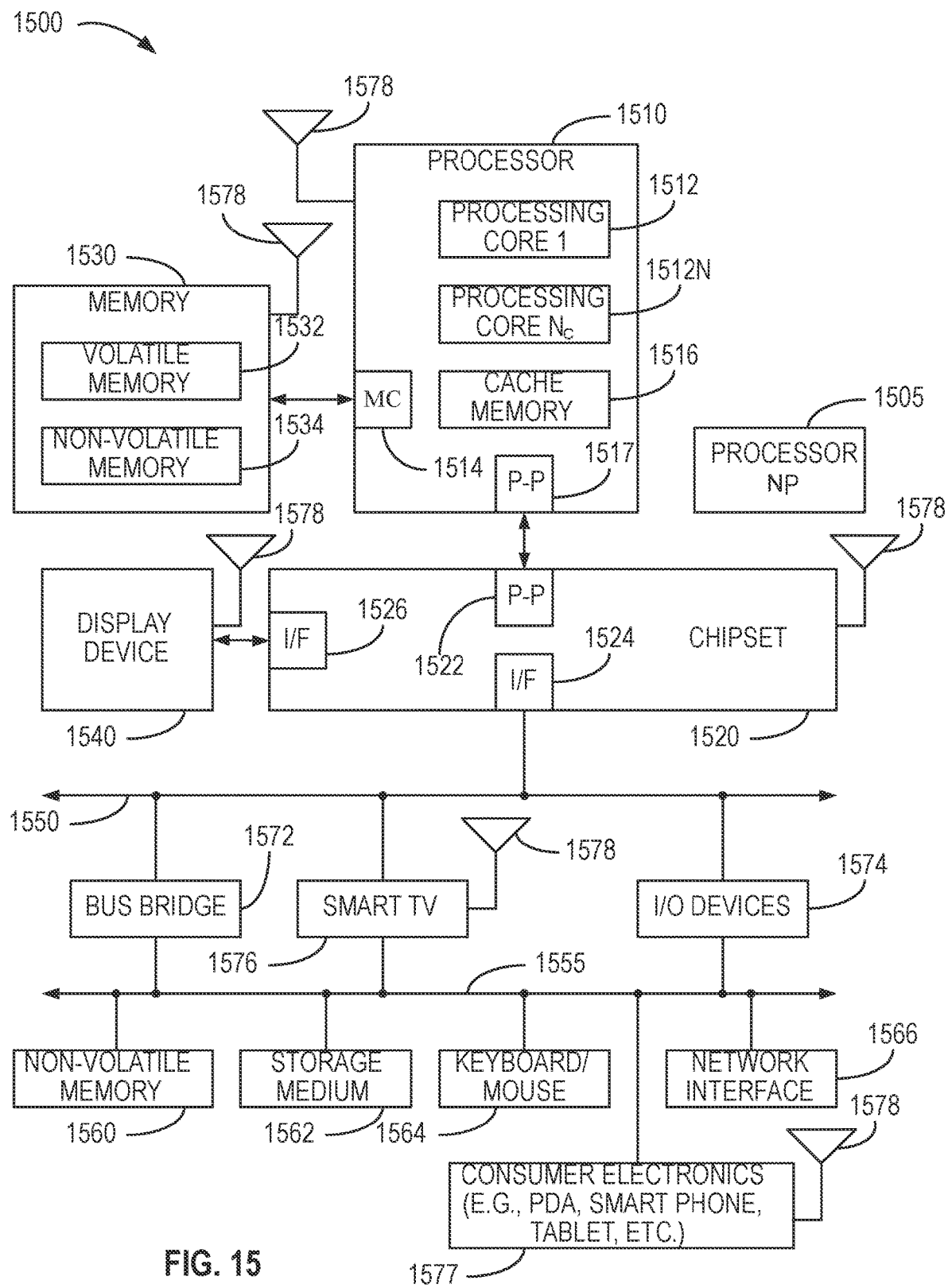
FIG. 15 is a block diagram of an example electrical device that may include a microelectronic assembly, in accordance with any of the embodiments disclosed herein.

FIG. 15 is a block diagram of an example electrical device 1500 that may include one or more of the gold boxes disclosed herein. In one embodiment, system 1500 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, system 1500 is a system on a chip (SOC) system.

In one embodiment, processor 1510 has one or more processing cores 1512 and 1512N, where 1512N represents the Nth processor core inside processor 1510 where N is a positive integer. In one embodiment, system 1500 includes multiple processors including 1510 and 1505, where processor 1505 has logic similar or identical to the logic of processor 1510. In some embodiments, processing core 1512 includes, but is not limited to, pre-fetch logic to fetch instructions, decode logic to decode the instructions, execution logic to execute instructions and the like. In some embodiments, processor 1510 has a cache memory 1516 to cache instructions and/or data for system 1500. Cache memory 1516 may be organized into a hierarchal structure including one or more levels of cache memory.

In some embodiments, processor 1510 includes a memory controller 1514, which is operable to perform functions that enable the processor 1510 to access and communicate with memory 1530 that includes a volatile memory 1532 and/or a non-volatile memory 1534. In some embodiments, processor 1510 is coupled with memory 1530 and chipset 1520. Processor 1510 may also be coupled to a wireless antenna 1578 to communicate with any device configured to transmit and/or receive wireless signals. In one embodiment, the wireless antenna interface 1578 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 1532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1534 includes, but is not limited to, flash memory, phase change memory (PCM), read-only memory (ROM), electrically erasable programmable read-only memory (EEPROM), or any other type of non-volatile memory device.

Memory 1530 stores information and instructions to be executed by processor 1510. In one embodiment, memory 1530 may also store temporary variables or other intermediate information while processor 1510 is executing instructions. In the illustrated embodiment, chipset 1520 connects with processor 1510 via Point-to-Point (PtP or P-P) interfaces 1517 and 1522. Chipset 1520 enables processor 1510 to connect to other elements in system 1500. In some embodiments of the invention, interfaces 1517 and 1522 operate in accordance with a PtP communication protocol such as the INTEL® QuickPath Interconnect (QPI) or the like. In other embodiments, a different interconnect may be used.

In some embodiments, chipset 1520 is operable to communicate with processor 1510, 1505N, display device 1540, and other devices 1572, 1576, 1574, 1560, 1562, 1564, 1566, 1577, etc. Chipset 1520 may also be coupled to a wireless antenna 1578 to communicate with any device configured to transmit and/or receive wireless signals.

Chipset 1520 connects to display device 1540 via interface 1526. Display 1540 may be, for example, a liquid crystal display (LCD), a plasma display, cathode ray tube (CRT) display, or any other form of visual display device. In some embodiments of the invention, processor 1510 and chipset 1520 are merged into a single SOC. In addition, chipset 1520 connects to one or more buses 1550 and 1555 that interconnect various elements 1574, 1560, 1562, 1564, and 1566. Buses 1550 and 1555 may be interconnected together via a bus bridge 1572. In one embodiment, chipset 1520 couples with a non-volatile memory 1560, a mass storage device(s) 1562, a keyboard/mouse 1564, and a network interface 1566 via interface 1524, smart TV 1576, consumer electronics 1577, etc.

In one embodiment, mass storage device 1562 includes, but is not limited to, a solid state drive, a hard disk drive, a universal serial bus flash memory drive, or any other form of computer data storage medium. In one embodiment, network interface 1566 is implemented by any type of well known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 15 are depicted as separate blocks within the system 1500, the functions performed by some of these blocks may be integrated within a single semiconductor circuit or may be implemented using two or more separate integrated circuits. For example, although cache memory 1516 is depicted as a separate block within processor 1510, cache memory 1516 (or selected aspects of 1516) can be incorporated into processor core 1512.

Additional Notes

The following, non-limiting examples, detail certain aspects of the present subject matter to solve the challenges and provide the benefits discussed herein, among others.

Example 1 is a microelectronics package comprising: a chassis that defines an opening; an insert sized to be received in the opening, the insert being made of a thermally conductive material; a photonic integrated circuit (PIC) attached to the insert; and a lid connected to the chassis and defining a cavity that encases the PIC, wherein both the insert and the lid form thermally conductive pathways away from the PIC.

In Example 2, the subject matter of Example 1 optionally includes an electrical integrated circuit (EIC) connected to the chassis and located within the cavity.

In Example 3, the subject matter of Example 2 optionally includes wherein the EIC comprises a transimpedance amplifier.

In Example 4, the subject matter of any one or more of Examples 2-3 optionally include a substrate bonding the EIC to the chassis.

In Example 5, the subject matter of any one or more of Examples 2-4 optionally include a wire bond electrically coupling the EIC to the PIC.

In Example 6, the subject matter of any one or more of Examples 1-5 optionally include a heat spreader die located in between the PIC and an inner surface of the lid, the heat spreader die forming a portion of one of the thermally conductive pathways away from the PIC.

In Example 7, the subject matter of Example 6 optionally includes a thermal interface material located in between the heat spreader die and the inner surface of the lid.

In Example 8, the subject matter of any one or more of Examples 1-7 optionally include a thermal interface material located in between the PIC and the chassis, the thermal interface material bonding the PIC to the chassis.

In Example 9, the subject matter of any one or more of Examples 1-8 optionally include wherein the insert is a ceramic insert.

In Example 10, the subject matter of any one or more of Examples 1-9 optionally include wherein the insert comprises one or more thermal vias.

In Example 11, the subject matter of Example 10 optionally includes wherein the one or more thermal vias are copper thermal vias.

In Example 12, the subject matter of any one or more of Examples 1-11 optionally include a first connector connected to the chassis and in electrical communication with the PIC; and a second connector comprising: a first rigid printed circuit board (PCB), a second rigid PCB, and a flexible PCB forming electrical communications pathways between the first rigid PCB and the second rigid PCB.

In Example 13, the subject matter of any one or more of Examples 1-12 optionally include solder located at least around a portion of the opening in between the chassis and the insert.

In Example 14, the subject matter of any one or more of Examples 1-13 optionally include a sinter paste located at least around a portion of the opening in between the chassis and the insert.

In Example 15, the subject matter of any one or more of Examples 1-14 optionally include wherein the chassis has a thermal conductivity that is less than a thermal conductivity of the insert.

In Example 16, the subject matter of any one or more of Examples 1-15 optionally include wherein the microelectronics package is a component of a light detection and ranging (LIDAR) system.

In Example 17, the subject matter of any one or more of Examples 1-16 optionally include an autonomous vehicle, the microelectronics package being a component of a navigation system of the autonomous vehicle.

In Example 18, the subject matter of any one or more of Examples 1-17 optionally include wherein the PIC comprises at least one of a laser, a semiconductor optical amplifier, and a photodiode.

Example 19 is a microelectronics package comprising: a chassis that defines an opening; an insert sized to be received in the opening, the insert being made of a thermally conductive material; a photonic integrated circuit (PIC) attached to the insert; an electrical integrated circuit (EIC) connected to the chassis and located within the cavity, the EIC electrically coupled to the PIC; and a lid connected to the chassis and defining a cavity that encases the PIC, wherein both the insert and the lid form thermally conductive pathways away from the PIC.

In Example 20, the subject matter of Example 19 optionally includes wherein the EIC comprises a transimpedance amplifier.

In Example 21, the subject matter of any one or more of Examples 19-20 optionally include a substrate bonding the EIC to the chassis.

In Example 22, the subject matter of any one or more of Examples 19-21 optionally include a heat spreader die located in between the PIC and an inner surface of the lid, the heat spreader die forming a portion of one of the thermally conductive pathways away from the PIC.

In Example 23, the subject matter of Example 22 optionally includes a thermal interface material located in between the heat spreader die and the inner surface of the lid.

In Example 24, the subject matter of any one or more of Examples 19-23 optionally include a thermal interface material located in between the PIC and the chassis, the thermal interface material bonding the PIC to the chassis.

In Example 25, the subject matter of any one or more of Examples 19-24 optionally include wherein the insert is a ceramic insert.

In Example 26, the subject matter of any one or more of Examples 19-25 optionally include wherein the insert comprises one or more thermal vias.

In Example 27, the subject matter of Example 26 optionally includes wherein the one or more thermal vias are copper thermal vias.

In Example 28, the subject matter of any one or more of Examples 19-27 optionally include a first connector connected to the chassis and in electrical communication with the PIC; and a second connector comprising: a first rigid printed circuit board (PCB), a second rigid PCB, and a flexible PCB forming electrical communications pathways between the first rigid PCB and the second rigid PCB.

In Example 29, the subject matter of any one or more of Examples 19-28 optionally include solder located at least around a portion of the opening in between the chassis and the insert.

In Example 30, the subject matter of any one or more of Examples 19-29 optionally include a sinter paste located at least around a portion of the opening in between the chassis and the insert.

In Example 31, the subject matter of any one or more of Examples 19-30 optionally include wherein the chassis has a thermal conductivity that is less than a thermal conductivity of the insert.

In Example 32, the subject matter of any one or more of Examples 19-31 optionally include wherein the microelectronics package is a component of a light detection and ranging (LIDAR) system.

In Example 33, the subject matter of any one or more of Examples 19-32 optionally include an autonomous vehicle, the microelectronics package being a component of a navigation system of the autonomous vehicle.

In Example 34, the subject matter of any one or more of Examples 19-33 optionally include wherein the PIC comprises at least one of a laser, a semiconductor optical amplifier, and a photodiode.

Example 35 is a light detection and ranging (LIDAR) system comprising: a chassis that defines an opening; an insert sized to be received in the opening, the insert being made of a thermally conductive material; a photonic integrated circuit (PIC) attached to the insert; an electrical integrated circuit (EIC) connected to the chassis and located within the cavity, the EIC electrically coupled to the PIC; a wire bond electrically coupling the PIC to the EIC; a lid connected to the chassis and defining a cavity that encases the PIC, a first connector connected to the chassis and in electrical communication with the PIC; and a second connector comprising: a first rigid printed circuit board (PCB) connected to the first connector, a second rigid PCB operable to connect to an external system, and a flexible PCB forming electrical communications pathways between the first rigid PCB and the second rigid PCB, wherein both the insert and the lid form thermally conductive pathways away from the PIC.

In Example 36, the subject matter of Example 35 optionally includes wherein the EIC comprises a transimpedance amplifier.

In Example 37, the subject matter of any one or more of Examples 35-36 optionally include a substrate bonding the EIC to the chassis.

In Example 38, the subject matter of any one or more of Examples 35-37 optionally include a heat spreader die located in between the PIC and an inner surface of the lid, the heat spreader die forming a portion of one of the thermally conductive pathways away from the PIC.

In Example 39, the subject matter of Example 38 optionally includes a thermal interface material located in between the heat spreader die and the inner surface of the lid.

In Example 40, the subject matter of any one or more of Examples 35-39 optionally include a thermal interface material located in between the PIC and the chassis, the thermal interface material bonding the PIC to the chassis.

In Example 41, the subject matter of any one or more of Examples 35-40 optionally include wherein the insert is a ceramic insert.

In Example 42, the subject matter of any one or more of Examples 35-41 optionally include wherein the insert comprises one or more thermal vias.

In Example 43, the subject matter of Example 42 optionally includes wherein the one or more thermal vias are copper thermal vias.

In Example 44, the subject matter of any one or more of Examples 35-43 optionally include solder located at least around a portion of the opening in between the chassis and the insert.

In Example 45, the subject matter of any one or more of Examples 35-44 optionally include a sinter paste located at least around a portion of the opening in between the chassis and the insert.

In Example 46, the subject matter of any one or more of Examples 35-45 optionally include wherein the chassis has a thermal conductivity that is less than a thermal conductivity of the insert.

In Example 47, the subject matter of any one or more of Examples 36-46 optionally include an autonomous vehicle, the microelectronics package being a component of a navigation system of the autonomous vehicle.

In Example 48, the subject matter of any one or more of Examples 36-47 optionally include wherein the PIC comprises at least one of a laser, a semiconductor optical amplifier, and a photodiode.

In Example 49, the microelectronics packages, systems, apparatuses, or method of any one or any combination of Examples 1-48 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A microelectronics package, comprising:
   a chassis comprising an opening;
   an insert in the opening, the insert comprising a thermally conductive material;
   a photonic integrated circuit (PIC) attached to the insert and thermally coupled with the insert;
   a lid connected to the chassis, wherein, the PIC is in a cavity between the lid and the chassis and is thermally coupled with the lid; and
   a die between the PIC and an inner surface of the lid, wherein the die is thermally coupled with the PIC.

2. The microelectronics package of claim 1, further comprising an electrical integrated circuit (EIC) within the cavity.

3. The microelectronics package of claim 2, wherein the EIC is bonded with the chassis.

4. The microelectronics package of claim 1, further comprising a thermal interface material between the die and the inner surface of the lid.

5. The microelectronics package of claim 1, further comprising a thermal interface material between the PIC and the chassis.

6. The microelectronics package of claim 1, wherein the insert comprises one or more vias.

7. The microelectronics package of claim 1, further comprising:
   a first connector connected to the chassis and coupled with the PIC; and
   a second connector comprising:
      a first rigid printed circuit board (PCB),
      a second rigid PCB, and
      a flexible PCB comprising electrical interconnects between the first rigid PCB and the second rigid PCB.

8. The microelectronics package of claim 1, wherein a thermal conductivity of the insert is greater than a thermal conductivity of the chassis.

9. The microelectronics package of claim 1, wherein the microelectronics package is part of a light detection and ranging (LIDAR) system.

10. The microelectronics package of claim 1, wherein the die is a heat spreader die.

11. The microelectronics package of claim 1, wherein the insert includes a ceramic material and comprises one or more vias, wherein the one or more vias include an electrically conductive material.

12. The microelectronics package of claim 1, further comprising:
   a first rigid printed circuit board (PCB);
   a second rigid PCB; and
   a flexible PCB comprising electrical interconnects between the first rigid PCB and the second rigid PCB.

13. The microelectronics package of claim 1, wherein:
   the chassis includes a step wedge, and the insert is attached to the step wedge when the insert is in the opening.

14. The microelectronics package of claim 1, wherein the PIC is to be received in the opening when the insert is received in the opening.

15. A light detection and ranging (LIDAR) system, comprising:
a chassis comprising an opening;
an insert to be received in the opening, the insert comprising a thermally conductive material;
a photonic integrated circuit (PIC) attached to the insert;
a lid attached to the chassis to form a cavity, wherein the PIC is in the cavity;
an electrical integrated circuit (EIC) connected to the chassis, wherein the EIC is in the cavity and is electrically coupled with the PIC;
a first connector connected to the chassis and in communicatively coupled with the PIC; and
a second connector, comprising:
a first rigid printed circuit board (PCB) connected to the first connector,
a second rigid PCB, and
a flexible PCB comprising electrical communications pathways between the first rigid PCB and the second rigid PCB.

16. The LIDAR system of claim 15, further comprising a die between the PIC and an inner surface of the lid, wherein the die is thermally coupled with the PIC and with the lid.

17. The LIDAR system of claim 15, wherein the insert comprises one or more thermal vias.

18. The LIDAR system of claim 15, further comprising a wire bond electrically coupled with the PIC and the EIC.

19. The LIDAR system of claim 15, wherein the insert and the lid are in thermally conductive coupling with the PIC.

20. A system, comprising:
a chassis comprising an opening;
an insert in the opening, the insert comprising a thermally conductive material;
a photonic integrated circuit (PIC) attached to the insert and thermally coupled with the insert;
a lid connected to the chassis, wherein the PIC is in a cavity between the lid and the chassis and is thermally coupled with the lid;
a first connector connected to the chassis and coupled with the PIC; and
a second connector comprising:
a first rigid printed circuit board (PCB),
a second rigid PCB, and
a flexible PCB comprising electrical interconnects between the first rigid PCB and the second rigid PCB.

21. The system of claim 20, further comprising an electrical integrated circuit (EIC) within the cavity.

22. The system of claim 20, further comprising a die between the PIC and an inner surface of the lid, wherein the die is thermally coupled with the PIC.

23. The system of claim 22, further comprising a thermal interface material between the die and the inner surface of the lid.

24. The system of claim 20, wherein the insert includes a ceramic material and comprises one or more vias, wherein the one or more vias include an electrically conductive material.

25. The system of claim 20, wherein the system is a light detection and ranging (LIDAR) system.

* * * * *

UNITED STATES PATENT AND TRADEMARK OFFICE
CERTIFICATE OF CORRECTION

| | |
|---|---|
| PATENT NO. | : 12,481,035 B2 |
| APPLICATION NO. | : 17/558201 |
| DATED | : November 25, 2025 |
| INVENTOR(S) | : Eleanor Patricia Paras Rabadam et al. |

Page 1 of 1

It is certified that error appears in the above-identified patent and that said Letters Patent is hereby corrected as shown below:

In the Claims

In Column 20, Claim 1, Line 20, delete "wherein," and insert -- wherein --, therefor Signed and Sealed this
Thirtieth Day of December, 2025

John A. Squires
*Director of the United States Patent and Trademark Office*